(12) United States Patent
Shin et al.

(10) Patent No.: US 9,857,641 B2
(45) Date of Patent: Jan. 2, 2018

(54) LIQUID CRYSTAL DISPLAY

(71) Applicant: Samsung Display Co. Ltd., Yongin-si (KR)

(72) Inventors: Cheol Shin, Hwaseong-si (KR); Hak Sun Chang, Yongin-si (KR); Ki Chul Shin, Seongnam-si (KR); Se Hyun Lee, Seoul (KR)

(73) Assignee: SAMSUNG DISPLAY CO. LTD., Gyeonggi-Do (KR)

( * ) Notice: Subject to any disclaimer, the term of this patent is extended or adjusted under 35 U.S.C. 154(b) by 10 days.

(21) Appl. No.: 15/182,752

(22) Filed: Jun. 15, 2016

(65) Prior Publication Data

US 2017/0153517 A1     Jun. 1, 2017

(30) Foreign Application Priority Data

Nov. 27, 2015 (KR) .................. 10-2015-0166909

(51) Int. Cl.
*G02F 1/1343* (2006.01)
*G02F 1/1337* (2006.01)

(52) U.S. Cl.
CPC .. *G02F 1/134336* (2013.01); *G02F 2201/123* (2013.01)

(58) Field of Classification Search
CPC ............ G02F 1/1343; G02F 1/134309; G02F 1/1337; G02F 1/133707; G02F 1/134336; G02F 1/133753; G02F 2001/134345; G02F 2001/133757; G02F 2001/134354; G02F 2201/122; G02F 2201/124; H01L 51/5203; G09G 2300/0426; G09G 2300/0465; G09G 2300/0447; G09G 2300/043; G09G 2300/0439; G09G 2320/068; G09G 3/2074
USPC ......... 349/43, 139, 144, 143, 141, 142, 129; 257/72; 345/103
See application file for complete search history.

(56) References Cited

U.S. PATENT DOCUMENTS 7,342,629 B2 * 3/2008 Yoshida ............ G02F 1/133555
349/113
8,441,604 B2    5/2013 Choi et al.
8,675,157 B2    3/2014 Lee et al.

* cited by examiner

*Primary Examiner* — Thoi Duong
(74) *Attorney, Agent, or Firm* — Cantor Colburn LLP

(57) ABSTRACT

A liquid crystal display ("LCD") includes: a substrate on which a pixel region is defined; and a pixel electrode which is disposed in the pixel region on the substrate. The pixel electrode includes: a plurality of unit pixel electrodes which are arranged substantially in a matrix form; and a connecting electrode which connects the unit pixel electrodes to each other. Neighboring unit pixel electrodes adjacent to each other in a column direction are separated from each other by a first in-between area extending along a row direction, neighboring unit pixel electrodes adjacent to each other in the row direction are separated from each other by a second in-between area extending along the column direction, and the connecting electrode is disposed in a region in which corners of the unit pixel electrodes face each other.

24 Claims, 17 Drawing Sheets

LIQUID CRYSTAL DISPLAY

This application claims priority to Korean Patent Application No. 10-2015-0166909, filed on Nov. 27, 2015, and all the benefits accruing therefrom under 35 U.S.C. §119, the content of which in its entirety is herein incorporated by reference.

BACKGROUND

1. Field

Embodiments of the invention relate to a liquid crystal display ("LCD").

2. Description of the Related Art

A liquid crystal display ("LCD") is one of the most widely used types of flat panel display. Generally, an LCD includes a pair of display panels having field generating electrodes, such as pixel electrodes and a common electrode, and a liquid crystal layer interposed between the display panels. In an LCD, voltages are applied to field generating electrodes to generate an electric field in a liquid crystal layer. Accordingly, the alignment of liquid crystal molecules of the liquid crystal layer is determined, and polarization of incident light is controlled. As a result, a desired image is displayed on the LCD.

Among various types of LCD, a vertically aligned ("VA") mode LCD, in which long axes of liquid crystal molecules are aligned perpendicular to upper and lower display panels when no electric field is applied, typically has high contrast ratios and wide standard viewing angles.

In a VA mode LCD, a plurality of domains having different alignment directions of liquid crystals may be formed in one pixel to improve viewing angle thereof.

A method of forming a plurality of domains has been suggested to form an incision part, such as slits, in a field generating electrode. In such a method, liquid crystals are rearranged by fringe fields formed between edges of the incision part and the field generating electrode which faces the incision part, thereby forming a plurality of domains.

In a VA mode LCD, an incision part such as micro-slits may be formed in a field generating electrode, or a protrusion may be formed on the field generating electrode, to secure a wide viewing angle. The incision part and the protrusion determine a tilt direction of liquid crystal molecules. Therefore, the tilt direction of the liquid crystal molecules may be diversified to various directions by appropriately placing the incision part and the protrusion, thereby widening the viewing angle of a VA mode LCD.

SUMMARY

Embodiments of the invention provide a liquid crystal display ("LCD") having improved visibility and transmittance by changing the position of a connecting electrode which connects unit pixel electrodes.

According to an embodiment of the invention, an LCD includes: a substrate on which a pixel region is defined; and a pixel electrode which is disposed in the pixel region on the substrate, where the pixel electrode includes: a plurality of unit pixel electrodes which are arranged substantially in a matrix form; and a connecting electrode which connects the unit pixel electrodes to each other. In such an embodiment, neighboring unit pixel electrodes adjacent to each other in a column direction are separated from each other by a first in-between area extending along a row direction, neighboring unit pixel electrodes adjacent to each other in the row direction are separated from each other by a second in-between area extending along the column direction, and the connecting electrode may be disposed in a region in which corners of the unit pixel electrodes face each other.

In an embodiment, each of the unit pixel electrodes may include: a stem electrode including a horizontal stem electrode and a vertical stem electrode which divide each of the unit pixel electrodes into a plurality of domains; and a micro-branch part including a plurality of branch electrodes which extend in a direction from a side of the stem electrode, where at least one of the branch electrodes disposed close to the region in which the corners of the unit pixel electrodes face each other may be connected to the connecting electrode.

In an embodiment, the micro-branch part of a unit pixel electrode may be disposed in each of the domains of the unit pixel electrode, the branch electrodes are disposed in the micro-branch part, and a plurality of slit patterns may be defined between the branch electrodes.

In an embodiment, the connecting electrode may include extension electrodes which extend from the at least one of the branch electrodes; and a land part disposed in a region on which the extension electrodes converge.

In an embodiment, each of the extension electrodes and the branch electrodes may have a width in a range of about 1 micrometer (μm) to about 5 μm.

In an embodiment, the branch electrodes or the slit patterns disposed in a domain may be arranged alternately with the branch electrodes or the slit patterns disposed in a neighboring domain adjacent to the domain.

In an embodiment, the branch electrodes and the slit patterns may be arranged at a pitch in a range of about 4 μm to about 8 μm.

In an embodiment, the horizontal stem electrode of a unit pixel electrode may horizontally divide the domains of the unit pixel electrode based on a region in which the horizontal stem electrode and the vertical stem electrode intersect each other, the vertical stem electrode of the unit pixel electrode may vertically divide the domains of the unit pixel electrode based on the region in which the horizontal stem electrode and the vertical stem electrode intersect each other, and the stem electrode of the unit pixel electrode may further include a central electrode disposed in the region in which the horizontal stem electrode and the vertical stem electrode intersect each other. In such an embodiment, the horizontal stem electrode and the vertical stem electrode gradually become narrower from the central electrode toward each side region of the unit pixel electrode.

In an embodiment, a length of the micro-branch part extending from a side of the central electrode to a corner region of the unit pixel electrode may be in a range of about 24 μm to about 32 μm.

In an embodiment, the stem electrode may have a width in a range of about 2 μm to about 5 μm.

In an embodiment, a chamfered pattern formed by partially removing the branch electrodes may be defined in a corner region of each of the unit pixel electrodes.

In an embodiment, the first in-between area or the second in-between area gradually may become narrower from a side region of each of the unit pixel electrodes toward a region adjacent to an end of the stem electrode thereof.

In an embodiment, a lengthwise direction of the branch electrodes may be the same as a direction of an azimuthal angle of liquid crystal molecules.

According to another embodiment of the invention, an LCD includes: a substrate on which a pixel region is defined; a pixel electrode which is disposed in the pixel region on the substrate; and a protrusion which is disposed on a connecting electrode, where the pixel electrode includes: a plurality of unit pixel electrodes which are arranged substantially in a matrix form; and the connecting electrode which connects the unit pixel electrodes to each other. In such an embodiment, neighboring unit pixel electrodes adjacent to each other in a column direction are separated from each other by a first in-between area extending along a row direction, neighboring unit pixel electrodes adjacent to each other in the row direction are separated from each other by a second in-between area extending along the column direction, and the connecting electrode is disposed in a region in which corners of the unit pixel electrodes face each other.

In an embodiment, the protrusion may have a circular shape, a quadrilateral shape or a combination thereof.

In an embodiment, each of the unit pixel electrodes may include: a stem electrode including a horizontal stem electrode and a vertical stem electrode which divide each of the unit pixel electrodes into a plurality of domains; and a micro-branch part including a plurality of branch electrodes which extend in a direction from a side of the stem electrode, where at least one of the branch electrodes disposed close to the region, in which the corners of the unit pixel electrodes face each other, may be connected to the connecting electrode.

In an embodiment, the horizontal stem electrode of a unit pixel electrode may horizontally divide the domains of the unit pixel electrode based on a region in which the horizontal stem electrode and the vertical stem electrode intersect each other, the vertical stem electrode of the unit pixel electrode may vertically divide the domains of the unit pixel electrode based on the region in which the horizontal stem electrode and the vertical stem electrode intersect each other, and the stem electrode of the unit pixel electrode may further include a central electrode disposed in the region in which the horizontal stem electrode and the vertical stem electrode intersect each other. In such an embodiment, the horizontal stem electrode and the vertical stem electrode may gradually become narrower from the central electrode toward each side region of the unit pixel electrode.

In an embodiment, the first in-between area or the second in-between area gradually may become narrower from a side region of each of the unit pixel electrodes toward a region adjacent to an end of the stem electrode thereof.

According to another embodiment of the invention, an LCD includes: a substrate on which a plurality of pixel regions is defined; a plurality of pixel electrodes disposed in the pixel regions on the substrate; and a protrusion which is disposed on a connecting electrode, where the pixel electrodes includes: a first pixel electrode which is disposed in a first pixel region of the pixel regions and including a plurality of unit pixel electrodes; a second pixel electrode which is disposed in a second pixel region of the pixel regions and including a plurality of unit pixel electrodes; and the connecting electrode which connects the unit pixel electrodes of the first pixel electrode or the second pixel electrode to each other. In such an embodiment, neighboring unit pixel electrodes adjacent to each other in a column direction are separated from each other by an in-between area extending along a row direction, neighboring unit pixel electrodes adjacent to each other in the row direction are separated from each other by a gap extending along the column direction, and the connecting electrode is disposed in a region in which corners of the unit pixel electrodes within a same pixel electrode face each other.

In an embodiment, each of the unit pixel electrodes may include: a stem electrode including a horizontal stem electrode and a vertical stem electrode which divide the unit pixel electrode into a plurality of domains; and a micro-branch part including a plurality of branch electrodes which extend in a direction from a side of the stem electrode, where at least one of the branch electrodes disposed close to the region in which corners of the unit pixel electrodes face each other may be connected to the connecting electrode.

In an embodiment, the connecting electrode may include extension electrodes which extend from the branch electrodes, where the extension electrodes converge on the in-between area.

In an embodiment, the protrusion may have a circular shape, a quadrilateral shape, or a combination thereof.

In an embodiment, the horizontal stem electrode of a unit pixel electrode may horizontally divide the domains of the unit pixel electrode based on a region in which the horizontal stem electrode and the vertical stem electrode intersect each other, the vertical stem electrode of the unit pixel electrode may vertically divide the domains based on the region in which the horizontal stem electrode and the vertical stem electrode intersect each other, and the stem electrode of the unit pixel electrode may further include a central electrode disposed in the region in which the horizontal stem electrode and the vertical stem electrode intersect each other, where the horizontal stem electrode and the vertical stem electrode may gradually become narrower from the central electrode toward each side region of the unit pixel electrode.

In an embodiment, the in-between area or the gap gradually may become narrower from a side region of each of the unit pixel electrodes toward a region adjacent to an end of the stem electrode thereof.

BRIEF DESCRIPTION OF THE DRAWINGS

The above and other aspects and features of the invention will become more apparent by describing in detail exemplary embodiments thereof with reference to the attached drawings, in which.

DETAILED DESCRIPTION

Figure 1:
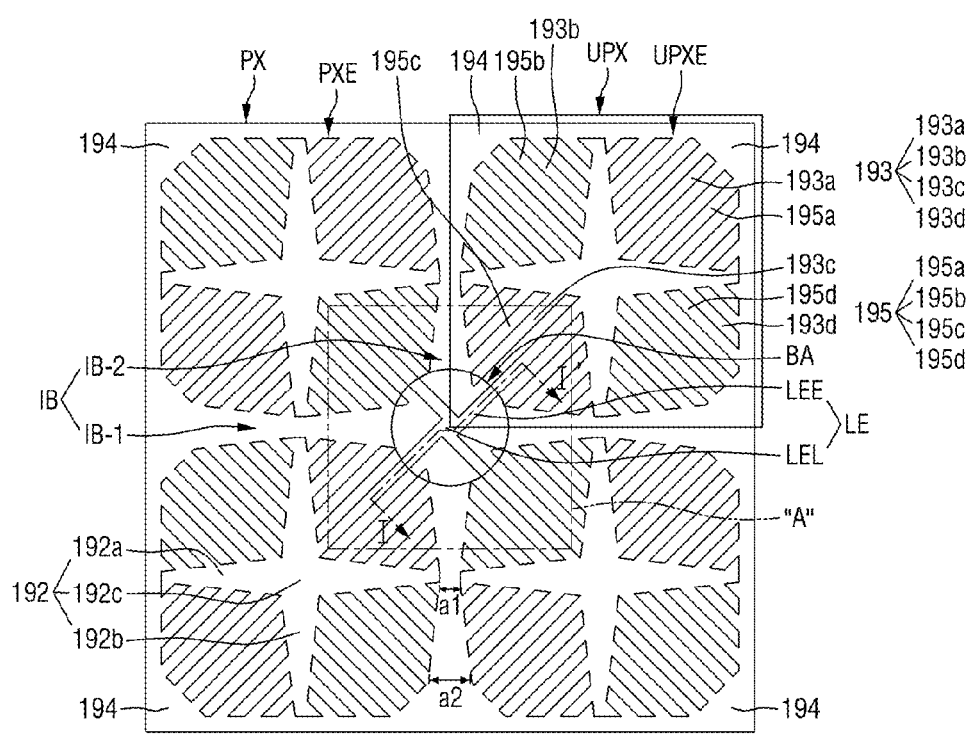
FIG. 1 is a schematic plan view of a pixel of a liquid crystal display ("LCD") according to an embodiment of the invention.

Advantages and features of the invention and methods of accomplishing the same may be understood more readily by reference to the following detailed description of preferred embodiments and the accompanying drawings. The invention may, however, be embodied in many different forms and should not be construed as being limited to the embodiments set forth herein. Rather, these embodiments are provided so that this disclosure will be thorough and complete and will fully convey the concept of the invention to those skilled in the art, and the invention will only be defined by the appended claims. Like reference numerals refer to like elements throughout the specification.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, these embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which the invention belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Hereinafter, embodiments of the invention will be described in detail with reference to the accompanying drawings.

Figure 2:
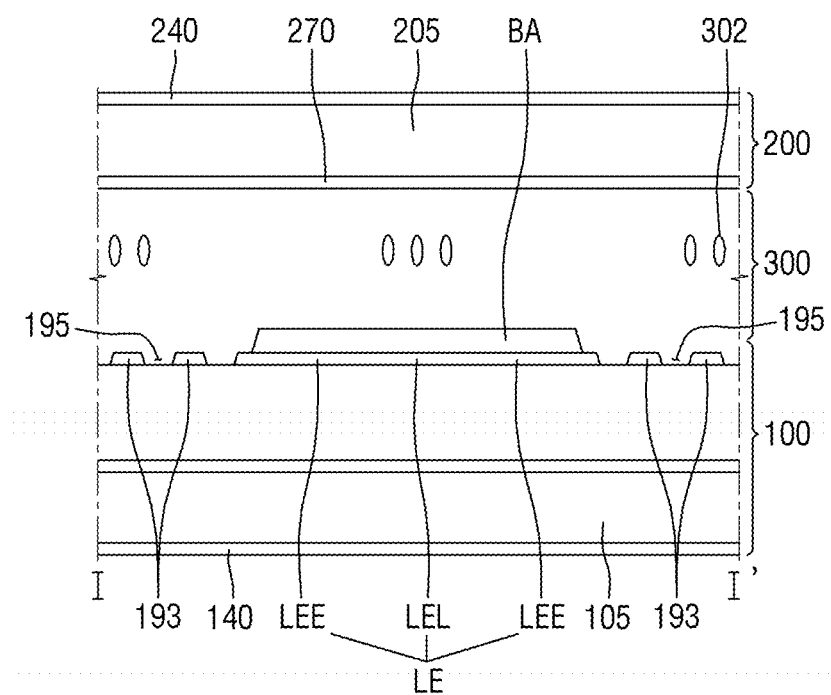
FIG. 2 is a schematic cross-sectional view of the LCD, taken along line I-I' of FIG. 1.
Figure 3:
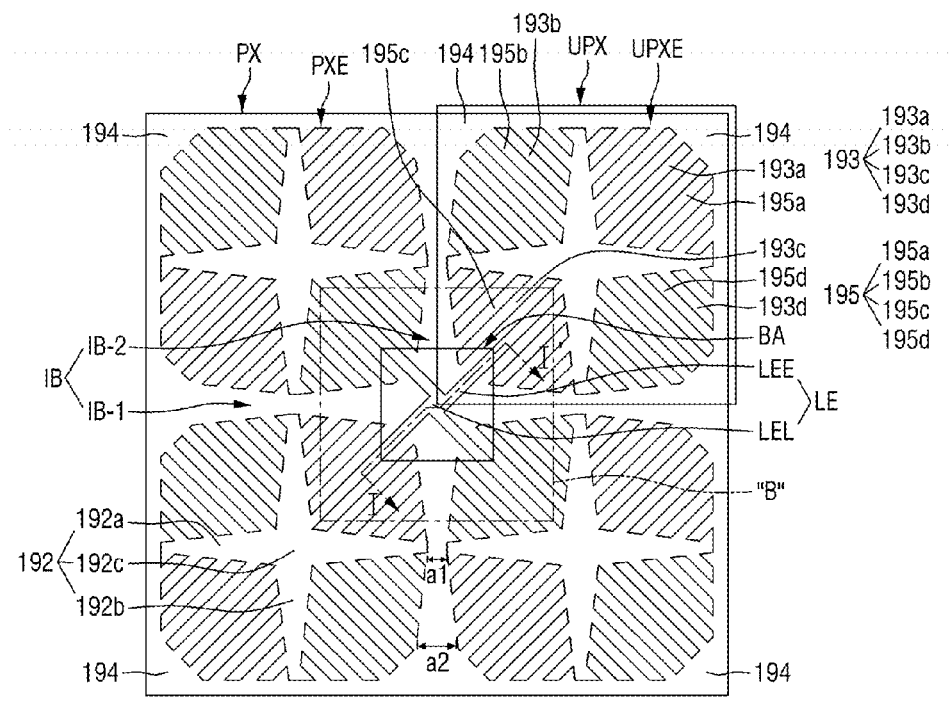
FIG. 3 is a plan view of a pixel of an LCD according to an alternative embodiment of the invention.
Figure 4:
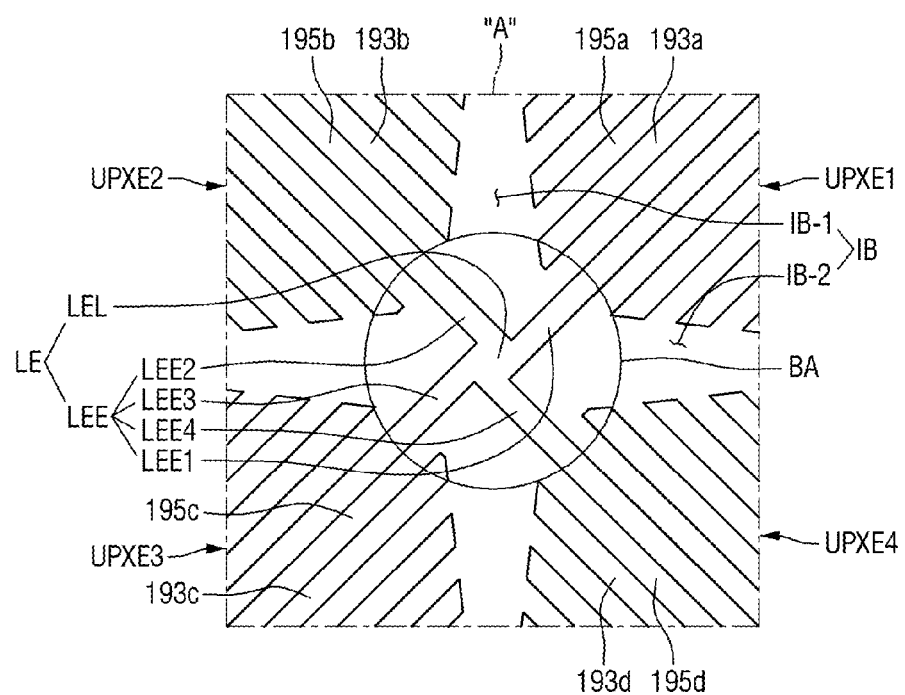
FIG. 4 is an enlarged view of a region "A" of FIG. 1.
Figure 5:
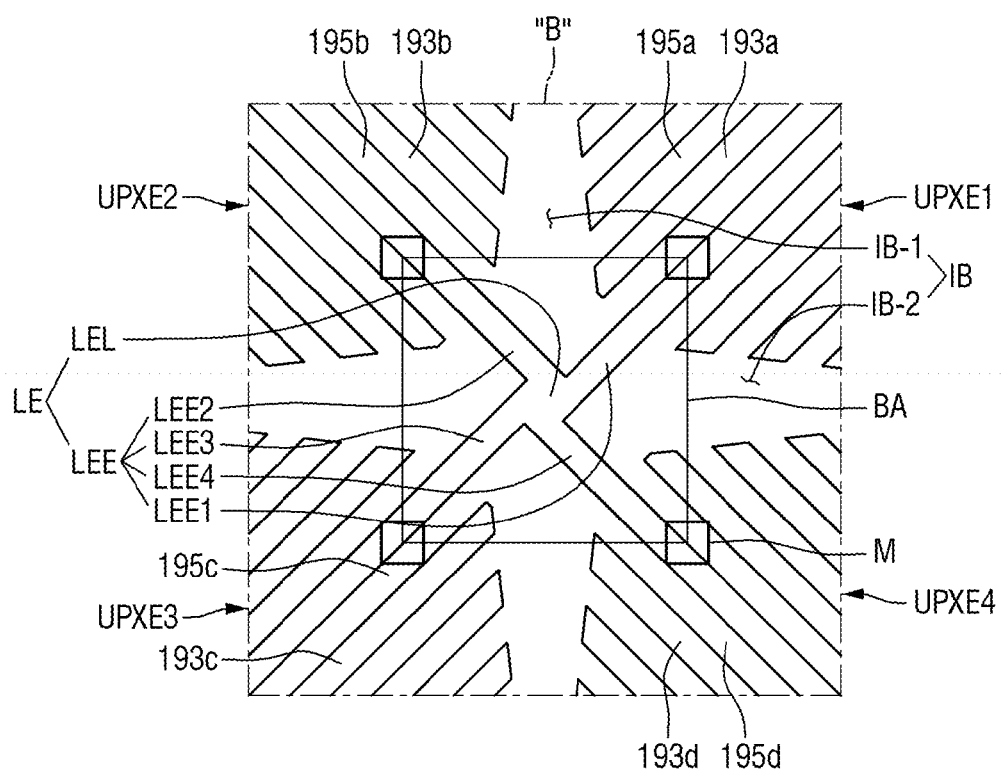
FIG. 5 is an enlarged view of a region "B" of FIG. 3.
Figure 6:
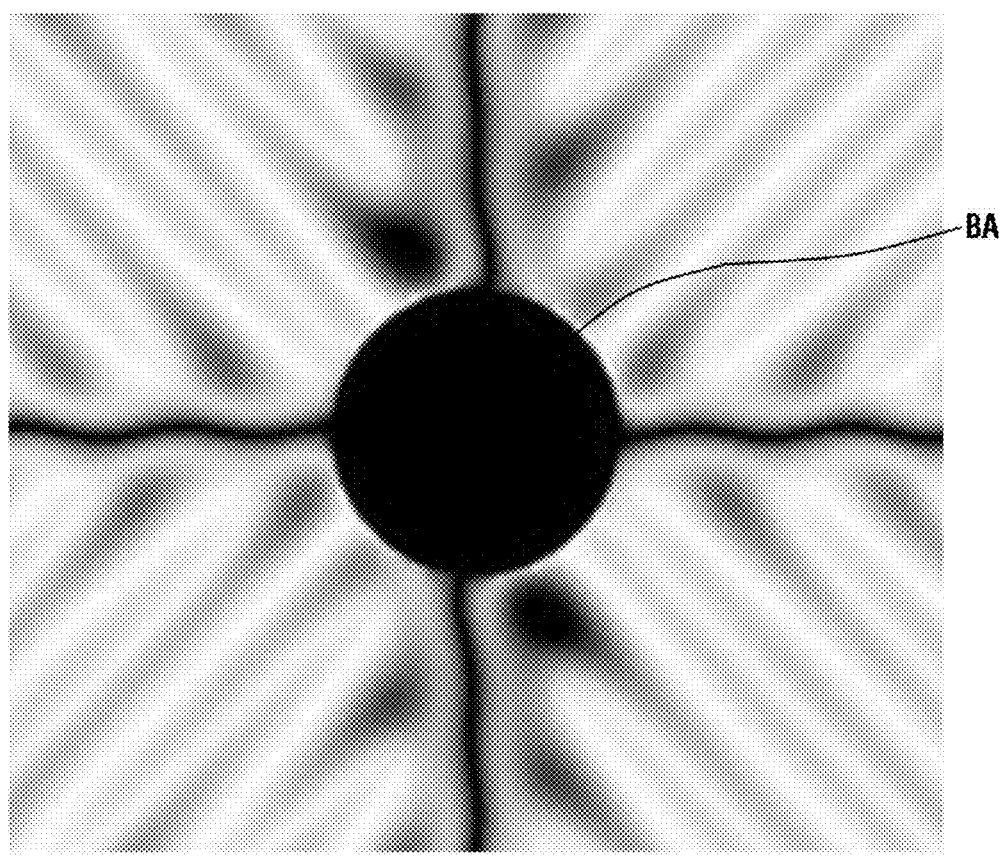
FIG. 6 is a photograph of the region "A" of FIG. 1.
Figure 7:
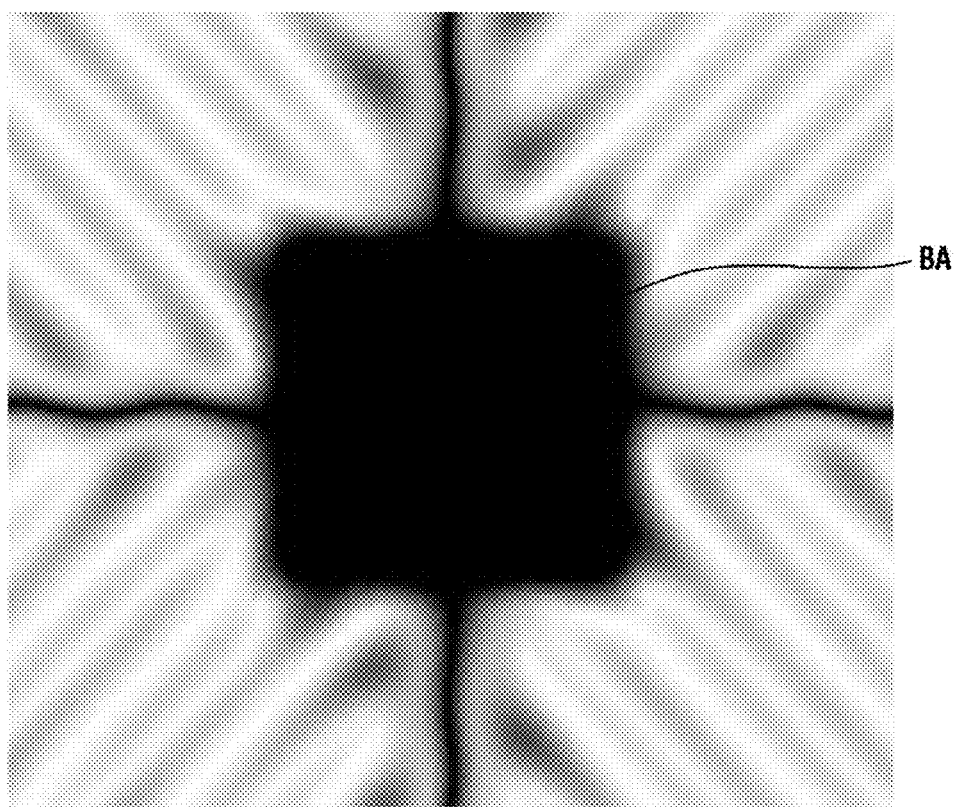
FIG. 7 is a photograph of the region "B" of FIG. 3.

FIG. 1 is a schematic plan view of a pixel of a liquid crystal display ("LCD") 1 according to an embodiment of the invention. FIG. 2 is a schematic cross-sectional view of the LCD 1, taken along line I-I' of FIG. 1. FIG. 3 is a plan view of a pixel of an LCD according to an alternative embodiment of the invention. FIG. 4 is an enlarged view of a region "A" of FIG. 1. FIG. 5 is an enlarged view of a region "B" of FIG. 3. FIG. 6 is a photograph of the region "A" of FIG. 1. FIG. 7 is a photograph of the region "B" of FIG. 3.

In an embodiment, the LCD 1 may include a plurality of pixels arranged substantially in a matrix form including rows and columns, and the pixels may have substantially the same structure as each other. In FIGS. 1 through 7, one pixel PX of the LCD 1 is illustrated for convenience of illustration.

Referring to FIGS. 1 and 2, an embodiment of the LCD 1 includes a first substrate 100 and a second substrate 200 which face each other and a liquid crystal layer 300 which is disposed between the first substrate 100 and the second substrate 200.

The first substrate 100 may include a first insulating substrate 105, a first electrode and a first alignment layer (not shown) which are disposed sequentially on a surface (e.g., an upper or inner surface) of the first insulating substrate 105, and a first polarizing plate 140 which is disposed on an opposing surface (e.g., a lower or outer surface) of the first insulating substrate 105. The first electrode disposed on the first substrate 100 may be, for example, a pixel electrode PXE.

The second substrate 200 may include a second insulating substrate 205, a second electrode and a second alignment layer (not shown) which are disposed sequentially on a surface (e.g., a lower or inner surface) of the second insulating substrate 205, and a second polarizing plate 240 which is disposed on an opposing surface (e.g., an upper or outer surface) of the second insulating substrate 205. The second electrode disposed on the second substrate 200 may be, for example, a common electrode 270.

The pixel PX may be roughly rectangular. The pixel electrode PXE may correspond to and cover the pixel PX, and the common electrode 270 may be disposed as a single piece on the whole of the second substrate 200.

In an LCD, where a pattern such as an incision part may be formed in the common electrode 270, the common electrode 270 and the pixel electrode PXE are desired to be aligned with each other to form a plurality of domains. In the case of a curved display device, however, the common electrode 270 and the pixel electrode PXE may be misaligned if a pattern such as an incision part is formed in the common electrode 270. In an LCD, where a pattern such as an incision part is not formed in the common electrode 270, the pixel electrode PXE and the common electrode 270 may be effectively aligned with each other, thereby effectively preventing defects such as unstable texture and a reduction in response speed and visibility.

The first substrate 100 or the second substrate 200 may further include a switching device (not illustrated), a color filter (not illustrated), and a light-blocking member (not illustrated). In an embodiment, one of the first polarizing plate 140 and a second polarizing plate 240 may be omitted. In some embodiments, any one or all of the first and second alignment layers may be omitted.

The liquid crystal layer 300 may include liquid crystals having negative dielectric anisotropy or positive dielectric anisotropy. Hereinafter, an embodiment where the liquid crystal layer 300 includes liquid crystals having negative dielectric anisotropy will be described for convenience of description, but not being limited thereto. When an electric field is not generated between the pixel electrode PXE and the common electrode 270, longitudinal axes of liquid crystal molecules 302 of the liquid crystal layer 300 may be arranged substantially perpendicular to surfaces of the first and second alignment layers. Alternatively, the longitudinal axes of the liquid crystal molecules 302 may be arranged at a pretilt angle with respect to a thickness direction of the liquid crystal layer 300.

When an electric field is generated in the liquid crystal layer 300 by applying a potential difference between the pixel electrode PXE and the common electrode 270, the longitudinal axes of the liquid crystal molecules 302 may be arranged perpendicular to the electric field. The degree to which the liquid crystal molecules 302 tilt may determine the degree of change in polarization of light incident upon the liquid crystal layer 300. The change in polarization may be converted into a change in transmittance by the first and second polarizing plates 140 and 240. Accordingly, an image may be displayed on the LCD 1.

In an embodiment, as shown in FIG. 1, the pixel electrode PXE disposed in the pixel PX may include a unit pixel electrode UPXE disposed in each of a plurality of unit pixel regions UPX. In such an embodiment, the pixel electrode PXE may include a plurality of unit pixel electrodes UPXE in the pixel PX.

In each of the unit pixel regions UPX, a unit pixel electrode UPXE is disposed and a plurality of slit patterns 195 may be defined. Each unit pixel electrode UPXE may include a stem electrode 192 and a micro-branch part 193 to form a plurality of domains.

In such an embodiment, an in-between area IB may be defined between neighboring unit pixel electrodes UPXE to separate the neighboring unit pixel electrodes UPXE. Herein, the in-between area IB means an area defined between an overall boundaries of the unit pixel electrodes UPXE in the pixel PX when viewed from a plan view, as shown in FIG. 1.

The in-between area IB may include a first in-between area IB-1 which extends along a row direction or a horizontal direction, to separate unit pixel electrodes UPXE neighboring each other in a column direction or a vertical direction, and a second in-between area IB-2 which extends along the column direction to separate unit pixel electrodes UPXE neighboring each other in the row direction. Therefore, the in-between area IB including the first in-between area IB-1 or/and the second in-between area IB-2 may be defined to divide the pixel electrode PXE into a plurality of unit pixel electrodes UPXE.

In such an embodiment, the pixel electrode PXE further includes a connecting electrode LE disposed in a region, e.g., a center region, in which corners of two or more unit pixel electrodes UPXE are disposed to be adjacent to each other with the first in-between area IB-1 or the second in-between area IB-2 interposed therebetween.

The connecting electrode LE may connect the unit pixel electrodes UPXE to each other. In one embodiment, for example, as illustrated in FIG. 1, the connecting electrode LE which connects the unit pixel electrodes UPXE may be disposed in a region in which four corners of the unit pixel electrodes UPXE face each other, e.g., in a region or area where the first in-between area IB-1 and the second in-between area IB-2 intersect each other.

A protrusion BA may be disposed on the connecting electrode LE. The protrusion BA will be described in detail later in connection with an arrangement of liquid crystals in the pixel PX.

Each of the unit pixel electrodes UPXE includes the stem electrode 192 which divides a unit pixel region UPX into a plurality of domains and the micro-branch part 193 which extends from the stem electrode 192 in different directions from each other.

The stem electrode 192 may include a vertical stem electrode 192b which vertically divides a unit pixel region UPX and a horizontal stem electrode 192a which horizontally divides the unit pixel region UPX. The horizontal and vertical stem electrodes 192a and 192b included in each of the unit pixel electrodes UPXE may define a plurality of domains in the unit pixel region UPX.

The micro-branch part 193 extending from the stem electrode 192 in different directions may include first through fourth branch electrodes 193a through 193d extending in the different directions, respectively.

Each of the unit pixel regions UPX may include first through fourth slit patterns 195a through 195d which are defined by the first through fourth branch electrodes 193a through 193d of the micro-branch part 193. The first through fourth slit patterns 195a through 195d and the stem electrode 192 may control the direction of an electric field.

In an embodiment, by patterning the unit pixel electrode UPXE of each unit pixel region UPX as described above, the liquid crystal molecules 302 may be arranged at different average liquid crystal azimuthal angles in each unit pixel region UPX. In such an embodiment, one unit pixel region UPX may be split into a plurality of domains in which the liquid crystal molecules 302 having different average liquid crystal azimuthal angles are arranged in different directions.

Each element disposed in each unit pixel region UPX will now be described in detail.

In an embodiment, each unit pixel region UPX may include the stem electrode 192 having the horizontal stem electrode 192a and the vertical stem electrode 192b. In such an embodiment, each unit pixel region UPX may include four domains, e.g., first through fourth domains Da through Dd (shown in FIG. 8) divided by the horizontal stem electrode 192a and the vertical stem electrode 192b as boundaries therebetween.

In an embodiment, the stem electrode 192 may have a width in a range of about 2 micrometers (μm) to about 5 μm. In some embodiments, the width of the stem electrode 192 may be adjusted to improve the control over liquid crystals. In an embodiment, the width of the stem electrode 192 may be reduced from a region in which the horizontal stem electrode 192a and the vertical stem electrode 192b intersect each other toward peripheral regions of each unit pixel region UPX, that is, from a center of each unit pixel electrode UPXE toward side regions thereof.

In such an embodiment, the width of the stem electrode 192 may be, but is not limited to, about 5 μm in the region in which the horizontal stem electrode 192a and the vertical stem electrode 192b intersect each other. In such an embodiment, the width of the stem electrode 192 disposed in side regions of each unit pixel region UPX may be, but is not limited to, about 2 μm.

The stem electrode 192 having a width of about 2 μm to about 5 μm may slope, thus improving texture by controlling the intensity of an electric field. Therefore, visibility may be improved without a reduction in transmittance of the pixel PX. The stem electrode 192 having a width of approximately 5 μm or less may effectively prevent a fringe field from increasing excessively at a boundary between the first and fourth domains and the second and third domains, thereby minimizing a reduction in visibility and transmittance. In such an embodiment, the stem electrode 192 having a width of about 5 μm or less may prevent the liquid crystal molecules 302 from lying in a region in which the stem electrode 192 is disposed. Therefore, a reduction in aperture ratio may be reduced.

A central electrode 192c may be disposed in the region in which the horizontal stem electrode 192a and the vertical stem electrode 192b intersect each other. The central electrode 192c may be wider than the horizontal and vertical stem electrodes 192a and 192b. In one embodiment, for example, the central electrode 192c may have a width of about 5 μm to about 12 μm. To improve the control over liquid crystals in a central region of each unit pixel region UPX, the central electrode 192c may be shaped like a diamond or an octagon.

As described above, each unit pixel region UPX may be divided into the first through fourth domains Da through Dd by the horizontal stem electrode 192a and the vertical stem electrode 192b of the stem electrode 192.

A unit pixel electrode UPXE disposed in each unit pixel region UPX includes the micro-branch part 193 which is connected to the horizontal stem electrode 192a and the vertical stem electrode 192b of the stem electrode 192 and extends in a direction from at least one side of each of the horizontal stem electrode 192a and the vertical stem electrode 192b. The micro-branch part 193 may include the first through fourth branch electrodes 193a through 193d disposed in the first through fourth domains Da through Dd, respectively.

In an embodiment, a chamfered pattern 194 formed by removing an end of the micro-branch part 193 may be defined in each corner region of each unit pixel region UPX. The chamfered patterns 194 may be formed by partially removing corner regions of the first through fourth branch electrodes 193a through 193d to expose an insulating layer, etc. disposed under each unit pixel electrode UPXE. The chamfered patterns 194 disposed in the corner regions may have asymmetrical areas.

The first through fourth slit patterns 195a through 195d may respectively be disposed in the first through fourth domains Da through Dd of each unit pixel region UPX. Each of the first through fourth slit patterns 195a through 195d may be formed by removing a gap between neighboring ones of the first through fourth branch electrodes 193a through 193d to expose the layer therebelow, e.g., the insulating layer. The first through fourth slit patterns 195a through 195d may separate the first through fourth branch electrodes 193a through 193d from each other.

The micro-branch part 193 extending from each side of each of the horizontal stem electrode 192a and the vertical stem electrode 192b of the stem electrode 192 may be disposed in each unit pixel region UPX. The liquid crystal molecules 302 may be arranged in different directions in the first through fourth domains Da through Dd, respectively, by the first through fourth branch electrodes 193a through 193d of the micro-branch part 193.

The first branch electrodes 193a of the micro-branch part 193 may be disposed in the first domain and extend obliquely in an upper right direction from the horizontal stem electrode 192a. The second branch electrodes 193b of the micro-branch part 193 may be disposed in the second domain and extend obliquely in an upper left direction from the horizontal stem electrode 192a. The third branch electrodes 193c of the micro-branch part 193 may be disposed in the third domain and extend obliquely in a lower left direction from the horizontal stem electrode 192a. The fourth branch electrodes 193d of the micro-branch part 193 may be disposed in the fourth domain and extend obliquely in a lower right direction from the horizontal stem electrode 192a.

In an embodiment, the first and second branch electrodes 193a and 193b may be disposed at angles of about 45 degrees and about 135 degrees to the horizontal stem electrode 192a, respectively. In such an embodiment, the third and fourth branch electrodes 193c and 193d may be disposed at angles of about 225 degrees and about 315 degrees to the horizontal stem electrode 192a, respectively. Branch electrodes of two neighboring domains may be disposed substantially orthogonal to each other.

In such an embodiment, the branch electrodes 193a through 193d, for example, the first branch electrodes 193a in the first domain may extend in a direction at an angle of about 30 degrees to about 60 degrees to a polarization axis of a polarizing plate.

Therefore, in each unit pixel region UPX, the first through fourth slit patterns 195a through 195d and the first through fourth branch electrodes 193a through 193d may extend diagonally to the horizontal stem electrode 192a and the vertical stem electrode 192b of the stem electrode 192, thereby forming the first through fourth domains Da through Dd. In such an embodiment, in each unit pixel region UPX, the liquid crystal molecules 302 may be arranged at different average liquid crystal azimuthal angles, at which maximum transmittance may be obtained, in the first through fourth domains Da through Dd.

The micro-branch part 194 extending from any one side of the horizontal stem electrode 192a or the vertical stem electrode 192b may improve the control over liquid crystals in each unit pixel electrode UPXE, thereby reducing texture and improving transmittance and lateral visibility.

Pixels of embodiments of the LCD according to the invention will now be described in detail with reference to FIGS. 2 through 6. The same or like elements shown in FIGS. 3 through 6 have been labeled with the same reference characters as used above to describe the embodiments of the LCD shown in FIGS. 1 and 2.

Referring to FIGS. 2 through 6, in an embodiment, a pixel PX may include a unit pixel electrode UPXE disposed in each of a plurality of unit pixel regions UPX. The unit pixel electrodes UPXE may be separated from each other by a predetermined gap to prevent the interference therebetween. Here, the gap is defined as an in-between area IB.

The in-between area IB may become wider from a region adjacent to ends of horizontal stem electrodes 192a or vertical stem electrodes 192b of stem electrodes 192 of neighboring unit pixel electrodes UPXE toward a region in which chamfered patterns 194 of the neighboring unit pixel electrodes UPXE are disposed. In such an embodiment, a region a2 of a first in-between area IB-1 or a second in-between area IB-2, which is disposed adjacent to the chamfered patterns 194, may be wider than a region a1 of the first in-between area IB-1 or the second in-between area IB-2 which is disposed adjacent to ends of the stem electrodes 192.

In such an embodiment, the first in-between area IB-1 or the second in-between area IB-2 may gradually become narrower from a side region of each unit pixel electrode UPXE toward a region adjacent to an end of a horizontal stem electrode 192a or a vertical stem electrode 192b of a stem electrode 192 of the unit pixel electrode UPXE.

In such an embodiment, the control over liquid crystals may be reduced as a distance from a central electrode 192c of each unit pixel electrode UPXE increases. In such an embodiment, widths of the chamfered patterns 194 and the in-between area IB may be adjusted to control the control over liquid crystals up to each corner region of each unit pixel electrode UPXE. In such an embodiment of the LCD 1, the intensity of an electric field formed in the pixel PX may be controlled by adjusting the width of the in-between area IB, thereby improving the control over liquid crystals.

First through fourth branch electrodes 193a through 193d of each unit pixel electrode UPXE may be alternately arranged with the first through fourth branch electrodes 193a through 193d of a neighboring unit pixel electrode UPXE. In such an embodiment, an end portion of the first through fourth branch electrodes 193a through 193d of each unit pixel electrode UPXE may be disposed to face a corresponding slit pattern of a neighboring unit pixel electrode UPXE.

In such an embodiment, where the first through fourth branch electrodes 193a through 193d of neighboring unit pixel electrodes UPXE are alternately arranged with each other, regions which are adjacent to ends of the first through fourth branch electrodes 193a through 193d and correspond to first through fourth slit patterns 195a through 195d of each unit pixel electrode UPXE, that is, regions in which liquid crystals are not moved due to the absence of a pixel electrode PXE may be compensated for, thereby further improving transmittance. In such an embodiment, the first through fourth branch electrodes 193a through 193d alternately arranged may effectively improve performance such as the control over liquid crystals.

The in-between area IB may include the first in-between area IB-1 and the second in-between area IB-2 which divide the pixel PX. Unit pixel electrodes UPXE neighboring each other in the column direction may be separated from each other by the first in-between area IB-1 extending along the row direction, and unit pixel electrodes UPXE neighboring each other in the row direction may be separated from each other by the second in-between area IB-2 extending along the column direction. In such an embodiment, the first in-between area IB-1 may horizontally divide the unit pixel electrodes UPXE in the pixel PX, and the second in-between area IB-2 may vertically divide the unit pixel electrodes UPXE in the pixel PX.

A connecting electrode LE may be disposed in a region in which corners of two or more unit pixel electrodes UPXE face each other with the first in-between area IB-1 or the second in-between area IB-2 interposed therebetween. The connecting electrode LE may connect the unit pixel electrodes UPXE to each other. In such an embodiment, a protrusion BA may be disposed on the connecting electrode LE.

Referring to FIGS. 4 and 5, the connecting electrode LE which connects the unit pixel electrodes UPXE is disposed in a region in which the first in-between area IB-1 and the second in-between area IB-2 intersect each other.

The connecting electrode LE may include a land part LEL and extension electrodes LEE. In an embodiment, the extension electrodes LEE of the connecting electrode LE may be defined by portions extending from one first branch electrode 193a, one second branch electrode 193b, one third branch electrode 193c and one fourth branch electrode 193d, respectively, to the land part LEL. The extension electrodes LEE may be disposed in the region in which the first in-between area IB-1 and the second in-between area IB-2 intersect each other. In an embodiment, as described above, the extension electrodes LEE are formed by extending one or more of the first through fourth branch electrodes 193a through 193d to the land part LEL to connect each unit pixel electrode UPXE to the land part LEL. In an alternative embodiment, the connecting electrode LE including the land part LEL and the extension electrodes LEE may be disposed in a region in which corners of the unit pixel electrodes UPXE face each other.

The extension electrodes LEE may have the same width as the first through fourth branch electrodes 193a through 193d. In one embodiment, for example, each of the first through fourth branch electrodes 193a through 193d may have a width in a range of about 1 μm to about 5 μm. In an embodiment, each of the first through fourth branch electrodes 193a through 193d may have a width of about 2 μm to about 4 μm. In an embodiment, each of the extension electrodes LEE extending from the first through fourth branch electrodes 193a through 193d may have a width in a range of about 1 μm to 5 μm.

The land part LEL is a region on which the extension electrodes LEE converge. The land part LEL may be wider than the extension electrodes LEE for easy connection of the unit pixel electrodes UPXE. Therefore, an end of each of the extension electrodes LEE may be connected to any one of the first through fourth branch electrodes 193a through 193d of each unit pixel electrode UPXE, and an opposing end thereof may be connected to the land part LEL.

In an embodiment, the extension electrodes LEE may include a first extension electrode LEE1 connected to a first unit pixel electrode UPXE1, a second extension electrode LEE2 connected to a second unit pixel electrode UPXE2, a third extension electrode LEE3 connected to a third unit pixel electrode UPXE3, and a fourth extension electrode LEE4 connected to a fourth unit pixel electrode UPXE4. The land part LEL may be disposed in a region on which the first extension electrode LEE1, the second extension electrode LEE2, the third extension electrode LEE3, and the fourth extension electrode LEE4 converge.

The protrusion BA may be disposed on the connecting electrode LE. The protrusion BA may cover the land part LEL and the extension electrodes LEE. Alternatively, the protrusion BA may cover the land part LEL and the extension electrodes LEE and overlap at least any one of the first through fourth branch electrodes 193a through 193d.

The protrusion BA may be disposed on the land part LEL to improve the control over liquid crystals in a corner region of each unit pixel electrode UPXE. In one embodiment, for example, the control over liquid crystals may be low in the corner region of each unit pixel electrode UPXE, that is, in a region in which the connecting electrode LE is disposed due to a long distance from a central electrode 192c of each unit pixel electrode UPXE. Therefore, the intensity of an electric field formed around the connecting electrode LE, that is, the control over liquid crystals around the connecting electrode LE may be low, thus the liquid crystal molecules 302 around the connecting electrode LE may not be arranged effectively in a certain direction.

In an embodiment, in each of the first through fourth domains Da through Dd, lengths of the first, second, third or fourth branch electrodes 193a, 193b, 193c or 193d extending from any one side of the central electrode 192c to a corner region of the pixel PX, that is, to a region in which a chamfered pattern 194 is disposed may be equal to a liquid crystal controllable distance of about 24 μm to about 32 μm. In one embodiment, for example, a distance from any one side of the central electrode 192c to the chamfered pattern 194 that contacts the ends of the first, second, third or fourth branch electrodes 193a, 193b, 193c or 193d may be in a range of about 26 μm to about 30 μm.

Any one of the first, second, third or fourth branch electrodes 193a, 193b, 193c or 193d having liquid crystal controllable lengths as described above may extend further to be connected to one of the extension electrodes LEE. Therefore, the region in which the connecting electrode LE is disposed may be located far away from the central electrode 192c due to the extension electrode LEE. As a result, the control over liquid crystals may be weak in the region in which the connecting electrode LE is disposed.

In such an embodiment, the intensity of an electric field generated between any one of the first, second, third or fourth branch electrodes 193a, 193b, 193c or 193d and each of the extension electrodes LEE may be similar to each other, thus the liquid crystal molecules 302 between any one of the first, second, third or fourth branch electrodes 193a, 193b, 193c or 193d and each of the extension electrodes LEE may not be arranged effectively in a certain direction.

The protrusion BA disposed on the region in which the connecting electrode LE is disposed may determine the arrangement direction of the liquid crystal molecules 302 located around the protrusion BA. Therefore, the protrusion BA may prevent the delayed restoration or non-restoration of the liquid crystal molecules 302 after generation of unstable texture, thereby improving transmittance and lateral visibility. The arrangement of the liquid crystal molecules 302 will be described later.

Referring to FIGS. 4 through 7, the protrusion BA may be circular or quadrilateral.

First, referring to FIGS. 4 and 6, a protrusion BA having a quadrilateral shape may be formed during a process of forming a black column spacer BCS. In one embodiment, for example, when the black column spacer BCS is formed, the protrusion BA may be formed using the land part LEL as an align key. The protrusion BA and the black column spacer BCS may be formed simultaneously using a same mask.

Referring to FIG. 6, since the liquid crystal molecules 302 are arranged perpendicular to a surface of the circular protrusion BA, the circular protrusion BA may provide a certain tilt angle. Therefore, the liquid crystal molecules 302 may be easily arranged in the direction of the provided tilt angle by the effect of an electric field.

However, due to the shape of the circular protrusion BA, some of the liquid crystal molecules 302 may be arranged in a direction affected by polarization axes of first and second polarizing plates 140 and 240. Therefore, texture may be generated around the circular protrusion BA. Accordingly, the leakage of light may occur around the circular protrusion BA due to the effect of the first and second polarizing plates 140 and 240. However, since few of the liquid crystal molecules 302 are arranged in the direction affected by the first and second polarizing plates 140 and 240 due to the circular protrusion BA, the effect of the leakage of light may be effectively minimized.

The circular protrusion BA may effectively prevent the delayed restoration or non-restoration of the liquid crystal molecules 302 after generation of unstable texture, thereby improving transmittance and lateral visibility.

Referring to FIGS. 5 and 7, a protrusion BA having a quadrilateral shape may be disposed on the connecting electrode LE. In such an embodiment, the quadrilateral protrusion BA may be formed by a general etching process. In the etching process, the shape of a pattern being formed may collapse in an edge region of the pattern.

In an embodiment, where the quadrilateral protrusion BA is formed as a quadrilateral pattern, the shape of the quadrilateral protrusion BA may become similar to that of the circular protrusion BA.

Accordingly, in such an embodiment, a patch mask M may further be placed in each corner region of a quadrilateral shape to maintain the quadrilateral shape in the process of forming the quadrilateral protrusion BA on the connecting electrode LE.

The quadrilateral protrusion BA formed as described above may effectively prevent the leakage of light by minimizing the number of liquid crystal molecules 302 affected by the polarization axes of the first and second polarizing plates 140 and 240. In such an embodiment, the quadrilateral protrusion BA may effectively prevent the delayed restoration or non-restoration of the liquid crystal molecules 302 after generation of unstable texture, thereby improving transmittance and lateral visibility.

Figure 8:
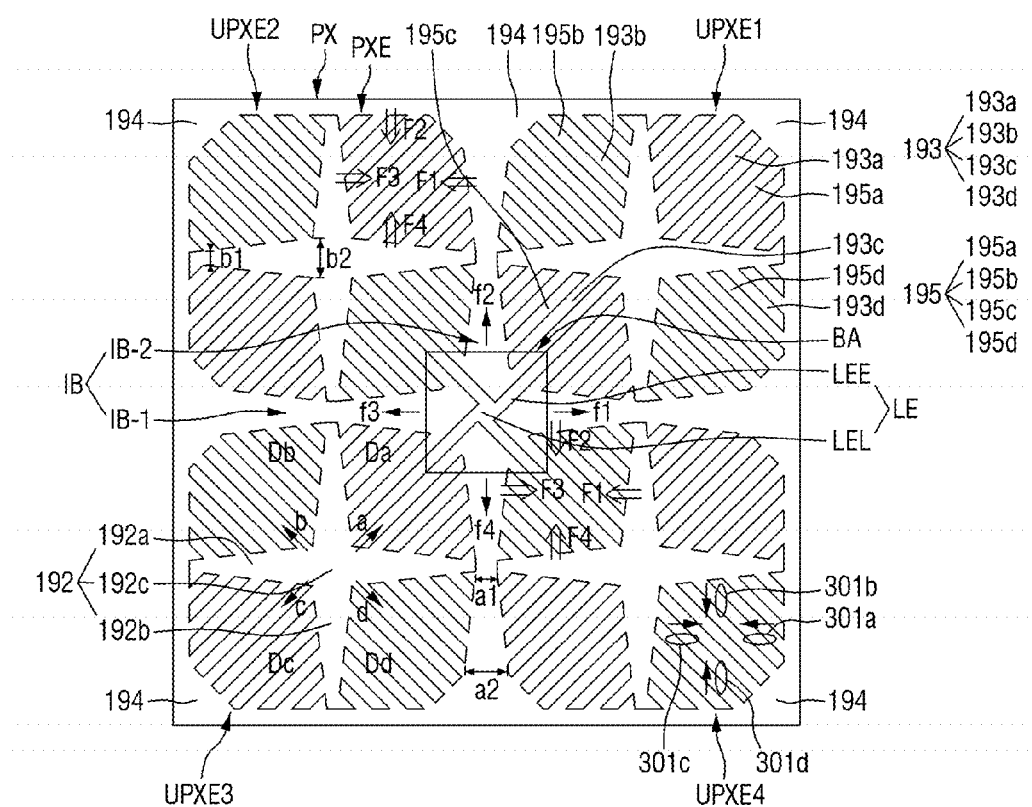
FIG. 8 is a plan view of a unit pixel electrode, illustrating arrangements of liquid crystals in a pixel according to an embodiment of the invention.
Figure 9:
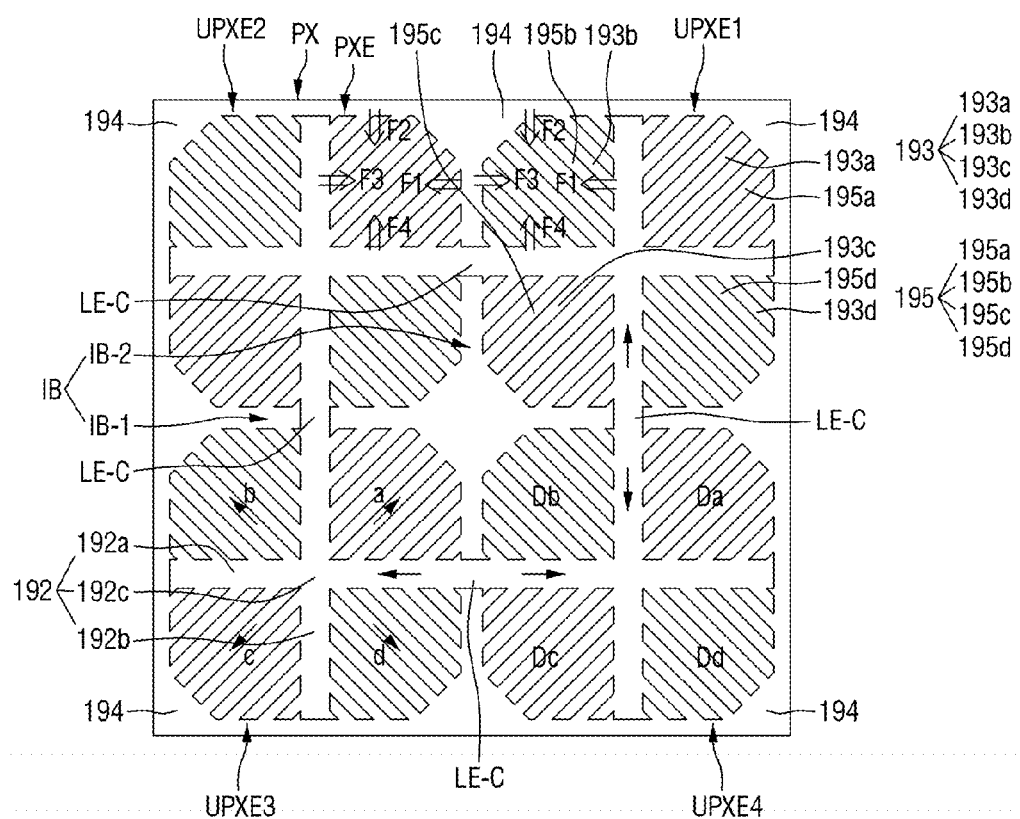
FIG. 9 is a plan view of a unit pixel electrode, illustrating arrangements of liquid crystals in a pixel according to Comparative Example 1.
Figure 10:
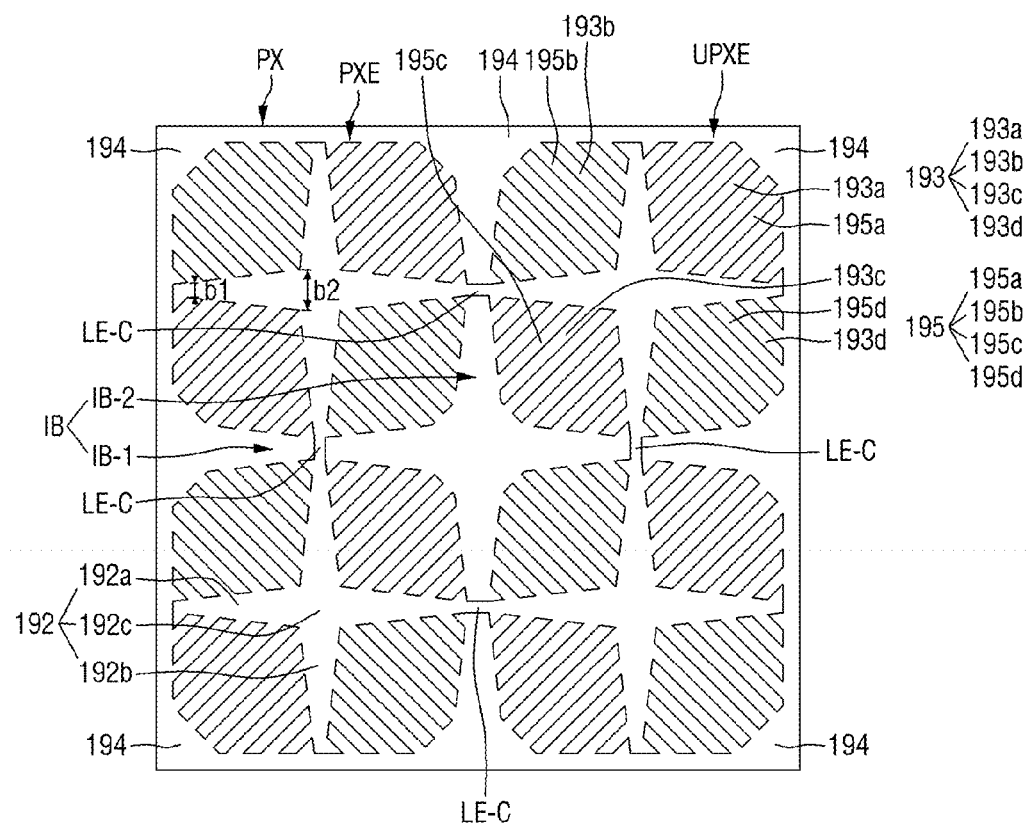
FIG. 10 is a plan view of a unit pixel electrode, illustrating arrangements of liquid crystals in a pixel according to Comparative Example 2.
Figure 11:
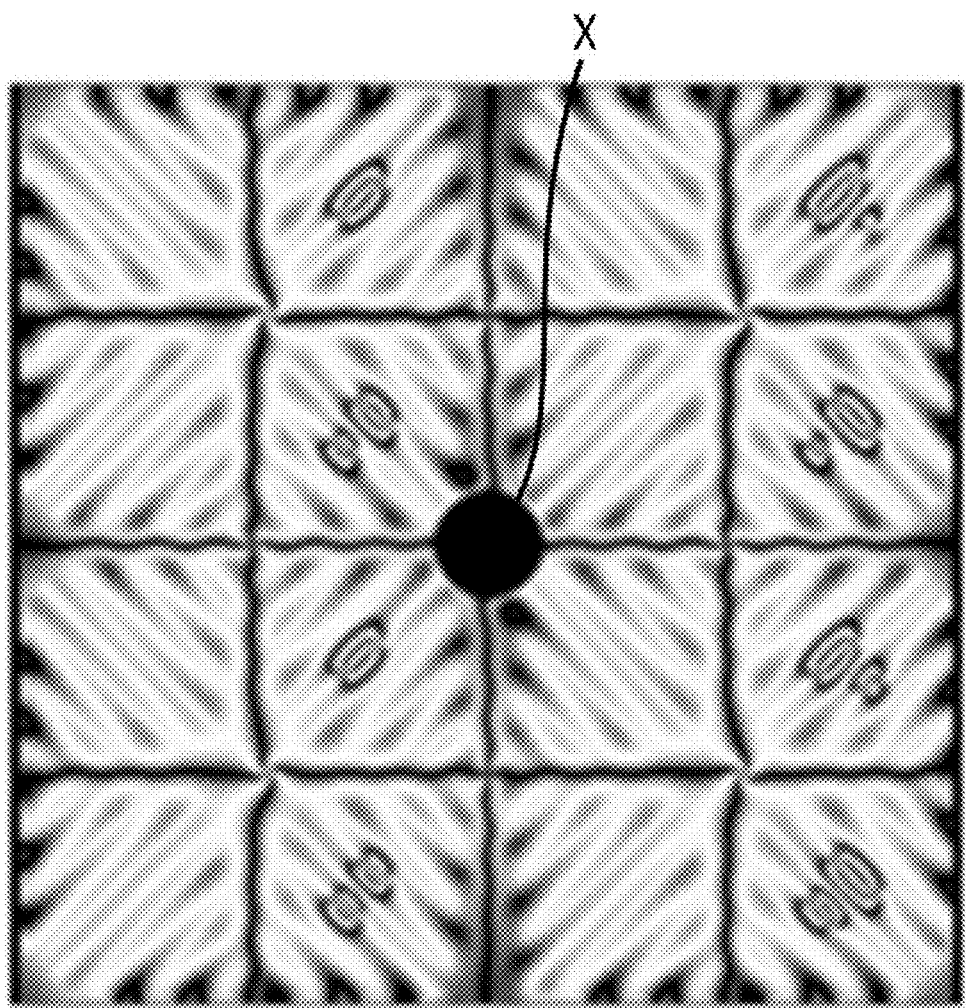
FIG. 11 is a photograph of the pixel according to the embodiment of FIG. 8.
Figure 12:
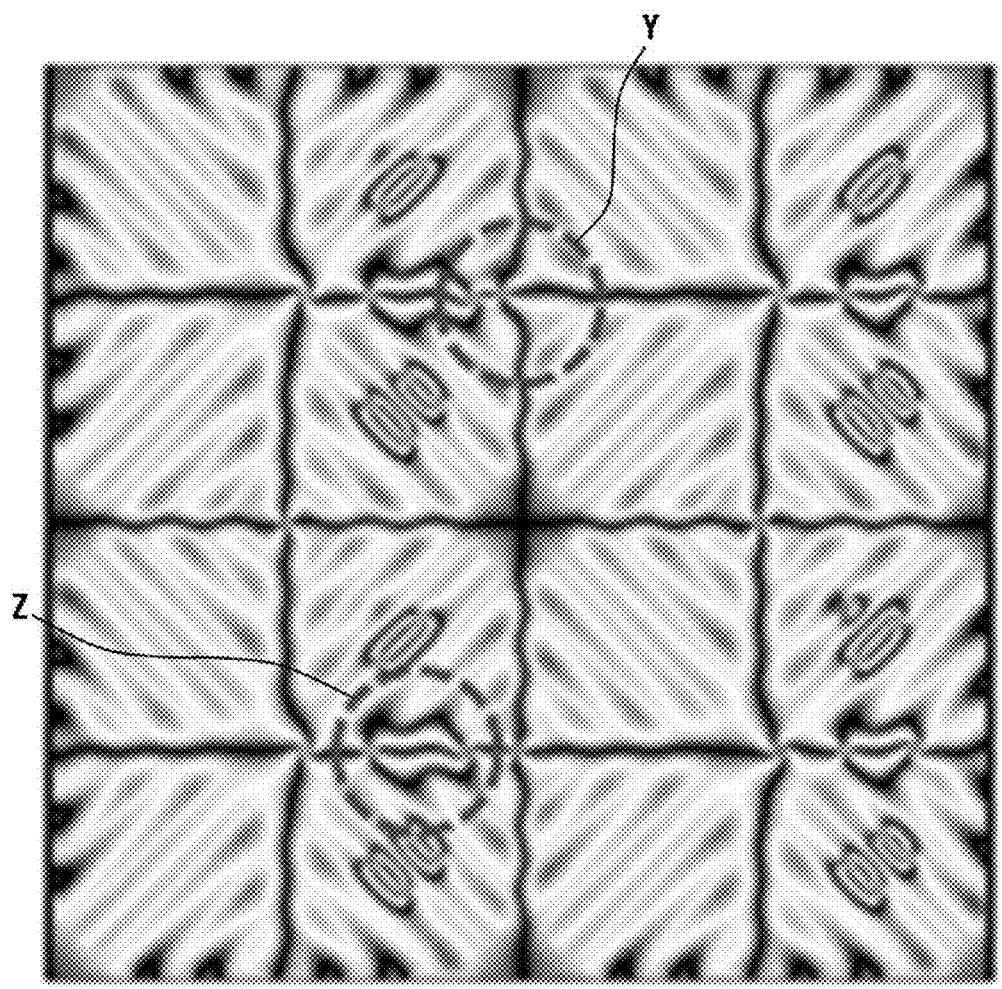
FIG. 12 is a photograph of the pixel according to Comparative Example 1 of FIG. 9.
Figure 13:
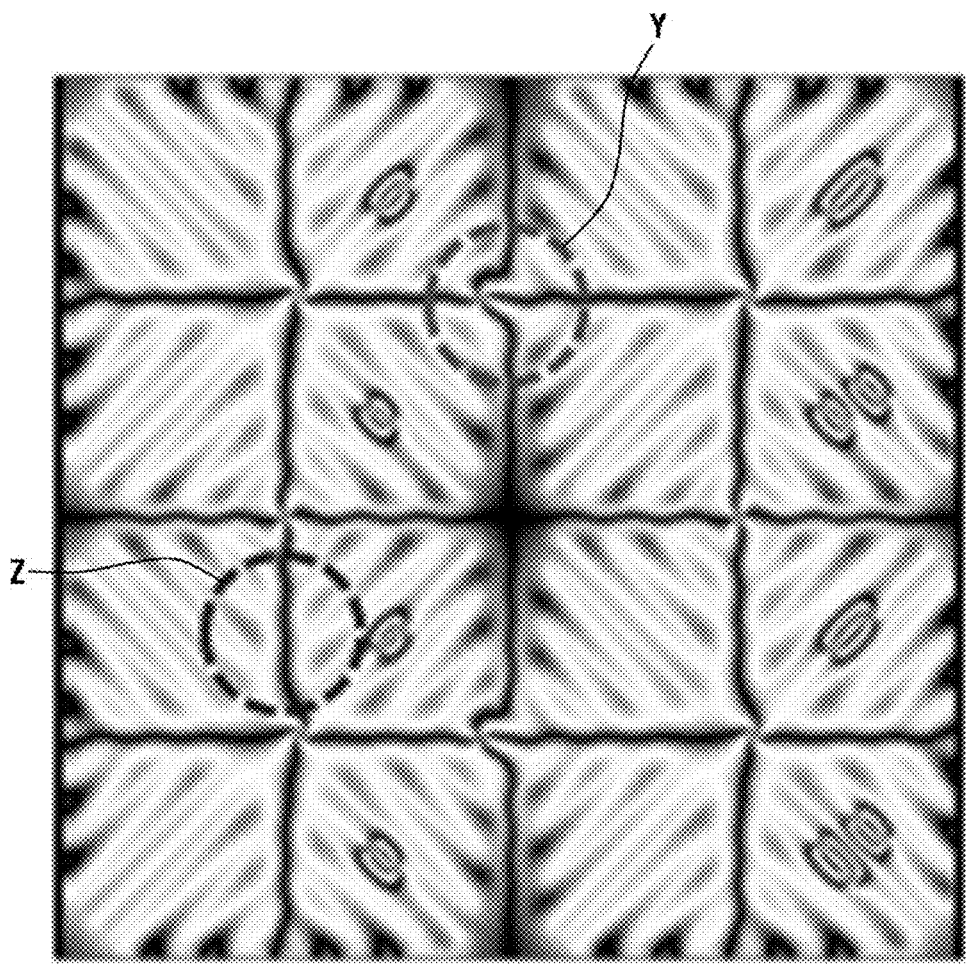
FIG. 13 is a photograph of the pixel according to Comparative Example 2 of FIG. 10.

FIG. 8 is a plan view of a unit pixel electrode, illustrating arrangement of liquid crystals in a pixel according to an embodiment of the invention. FIG. 9 is a plan view of a unit pixel electrode, illustrating arrangement of liquid crystals in a pixel according to Comparative Example 1. FIG. 10 is a plan view of a unit pixel electrode, illustrating arrangement of liquid crystals in a pixel according to Comparative Example 2. FIG. 11 is a photograph of the pixel according to the embodiment of FIG. 8. FIG. 12 is a photograph of the pixel according to Comparative Example 1 of FIG. 9. FIG. 13 is a photograph of the pixel according to Comparative Example 2 of FIG. 10. The same or like elements shown in FIGS. 8 through 11 have been labeled with the same reference characters as used above to describe the embodiments of the LCD shown in FIGS. 1 through 7, and any repetitive detailed description thereof will hereinafter be omitted or simplified.

The arrangements or movements of liquid crystal molecules 302 in a unit pixel region UPX will now be described with reference to FIGS. 8 through 13. Referring to FIGS. 8 through 13, an electric field may be generated in a liquid crystal layer 300 between a pixel electrode PXE and a common electrode 270 by applying a data voltage to the pixel electrode PXE and a common voltage to the common electrode 270.

In response to the electric field generated in the liquid crystal layer 300 including the liquid crystal molecules 302, fringe fields (F1-F4) may be generated by the common electrode 270 and the pixel electrode PXE. The fringe fields (F1-F4) that move the liquid crystal molecules 302 may include a first horizontal electric field F1 which is a horizontal electric field component in a first direction, a second horizontal electric field F2 which is a horizontal electric field component in a second direction, a third horizontal electric field F3 which is a horizontal electric field component in a third direction, and a fourth horizontal electric field F4 which is a horizontal electric field component in a fourth direction, as shown in FIGS. 8 and 9.

When the electric field is generated in the liquid crystal layer 300, the first and second horizontal electric fields F1 and F2 may be generated in directions from two sides (e.g., left and top sides) of a unit pixel electrode UPXE toward the inside of the unit pixel region UPX and move the liquid crystal molecules 302 in directions of first and second directors 301a and 301b. In such an embodiment, the third and fourth horizontal electric fields F3 and F4 may be generated in directions from a horizontal stem electrode 192a and a vertical stem electrode 192b of a cross-shaped stem electrode 192 toward the outside of the unit pixel region UPX and move the liquid crystal molecules 302 in directions of third and fourth directors 301c and 301d.

Here, the liquid crystal molecules 302 moved in the directions of the first through fourth directors 301a through 301d may tilt in a direction substantially parallel to polarization axes of first and second polarizing plates 140 and 240, and the liquid crystal molecules 302 may tilt in four directions in the domains of the unit pixel region UPX.

More specifically, the first and second directors 301a and 301b of the liquid crystal molecules 302 located adjacent to edges of a unit pixel electrode UPXE in one unit pixel region UPX may be perpendicular to the edges of the unit pixel electrode UPXE, respectively. In addition, the third and fourth directors 301c and 301d of the liquid crystal molecules 302 located adjacent to the horizontal stem electrode 192a and the vertical stem electrode 192b of the stem electrode 192 in one unit pixel electrode UPXE may be perpendicular to edges of the horizontal stem electrode 192a and the vertical stem electrode 192b of the stem electrode 192, respectively.

In one unit pixel region UPX, the fringe fields (F1-F4) generated by the edges of a unit pixel electrode UPXE and the horizontal stem electrode 192a and the vertical stem electrode 192b of the stem electrode 192 may initially move the liquid crystal molecules 302 to be arranged in the directions of the first through fourth directors 301a through 301d.

Accordingly, the liquid crystal molecules 302 may initially be arranged in the directions of the first through fourth directors 301a through 301d by the fringe fields (F1-F4) generated by the electrodes to be roughly parallel to the polarization axes of the first and second polarizing plates 140 and 240.

The liquid crystal molecules 302 arranged in the directions of the first through fourth directors 301a through 301d may collide with each other within the unit pixel region UPX to be rearranged in a direction that minimizes the adjustment of the first through fourth directors 301a through 301d. The direction in which the first through fourth directors 301a through 301d are rearranged may be a direction corresponding to the sum of vectors indicating the directions of the first through fourth directors 301a through 301d.

Therefore, the rearrangement direction of the liquid crystal molecules 302, that is, the direction corresponding to the sum of the vectors indicating the directions of the first through fourth directors 301a through 301d may be a direction similar to a direction in which first, second, third or fourth branch electrodes 193a, 193b, 193c or 193d extend in each of first through fourth domains Da through Dd. Accordingly, the liquid crystal molecules 302 may be arranged at a different average liquid crystal azimuthal angle in each of the first through fourth domains Da through Dd of one unit pixel region UPX.

The first through fourth directors 301a through 301d may be formed in the first, second, third or fourth branch electrodes 193a, 193b, 193c or 193d disposed between first, second, third or fourth slit patterns 195a, 195b, 195c or 195d in each of the first through fourth domains Da through Dd.

In each of the first through fourth domains Da through Dd, sides of the first, second, third or fourth branch electrodes 193a, 193b, 193c or 193d may generate horizontal components perpendicular thereto by distorting an electric field, and the direction in which the liquid crystal molecules 302 tilt may be determined by the fringe fields (F1-F4). Therefore, the liquid crystal molecules 302 initially tend to tilt in a direction perpendicular to the sides of the first, second, third or fourth branch electrodes 193a, 193b, 193c or 193d.

Here, horizontal components of an electric field generated by sides of neighboring first, second, third or fourth branch electrodes 193a, 193b, 193c or 193d have opposite directions, and a gap between the first, second, third or fourth branch electrodes 193a, 193b, 193c or 193d is substantially small. Therefore, the liquid crystal molecules 302 that tend to tilt in opposite directions may tilt in a direction parallel to a lengthwise direction of the first, second, third or fourth branch electrodes 193a, 193b, 193c or 193d.

As described above, the liquid crystal molecules 302 may be tilted in the direction parallel to the lengthwise direction of the first, second, third or fourth branch electrodes 193a, 193b, 193c or 193d through two stages as in the current embodiment. However, the liquid crystal molecules 302 may also be tilted in the direction parallel to the lengthwise direction of the first, second, third or fourth branch electrodes 193a, 193b, 193c or 193d by forming, for example, steps on a substrate. In this case, the steps may cause the liquid crystal molecules 302 to pretilt in the direction parallel to the lengthwise direction of the first, second, third or fourth branch electrodes 193a, 193b, 193c or 193d.

If the first through fourth slit patterns 195a through 195d are formed in the unit pixel region UPX as described above, the liquid crystal molecules 310 may be arranged in the directions of the first through fourth directors 301a through 301d by the effect of the fringe fields (F1-F4). The liquid crystal molecules 302 arranged in the directions of the first through fourth directors 301*a* through 301*d* may be rearranged in a direction in each of the first through fourth domains Da through Dd due to the collision between them. The rearranged liquid crystal molecules 302 may tilt at an angle of 45 degrees to the polarization axes, thereby achieving maximum transmittance.

Such movements of the liquid crystal molecules 302 may cause the liquid crystal molecules 302 to be arranged in a different direction in each of the first through fourth domains Da through Dd. In each of the first through fourth domains Da through Dd, for example, in the first domain Da, the liquid crystal molecules 302 may be arranged in directions similar to any one direction. In such an embodiment, not all of the liquid crystal molecules 302 may be arranged in the same direction in the first domain Da, but the liquid crystal molecules 302 may be arranged in directions similar to any one direction in the first domain Da. The arrangement direction of the liquid crystal molecules 302 arranged in directions similar to any one direction in any one domain will hereinafter be defined as an average liquid crystal azimuthal angle.

Referring back to FIGS. 8 through 10, in an embodiment, directors of the liquid crystal molecules 302 in the first domain Da of the unit pixel region UPX may be arranged obliquely in an upper right direction from the horizontal stem electrode 192*a*, thereby forming the average liquid crystal azimuthal angle of the first domain Da in an 'a' direction.

In such an embodiment, directors of the liquid crystal molecules 302 in the second domain Db of the unit pixel region UPX may be arranged obliquely in an upper left direction from the horizontal stem electrode 192*a*, thereby forming the average liquid crystal azimuthal angle of the second domain Db in a 'b' direction.

In such an embodiment, directors of the liquid crystal molecules 302 in the third domain Dc of the unit pixel region UPX may be arranged obliquely in a lower left direction from the horizontal stem electrode 192*a*, thereby forming the average liquid crystal azimuthal angle of the third domain Dc in a 'c' direction.

In such an embodiment, directors of the liquid crystal molecules 302 in the fourth domain Dd of the unit pixel region UPX may be arranged obliquely in a lower right direction from the horizontal stem electrode 192*a*, thereby forming the average liquid crystal azimuthal angle of the fourth domain Dd in a 'd' direction.

In such an embodiment, the direction a, b, c or d of the average liquid crystal azimuthal angle of each domain may be similar to the extending direction or the lengthwise direction of the first, second, third or fourth branch electrodes 193*a*, 193*b*, 193*c* or 193*d*.

Therefore, liquid crystals may be controlled to be arranged in different directions along the lengthwise directions of the first through fourth branch electrodes 193*a* through 193*d* in the first through fourth domains Da through Dd such that lateral visibility of the LCD 1 may be improved.

In a region in which the horizontal stem electrode 192*a* or the vertical stem electrode 192*b* of the stem electrode 192 is disposed, the intensity of the fringe fields (F1-F4) applied to the unit pixel electrode UPXE may be controlled by adjusting the width of the horizontal stem electrode 192*a* or the vertical stem electrode 192*b*. In such an embodiment, response time may be controlled by adjusting the size of a central electrode 192*c* disposed in a region in which the horizontal stem electrode 192*a* and the vertical stem electrode 192*b* intersect each other. The fringe fields (F1-F4) may not be generated in the region in which the stem electrode 192 is disposed.

In an embodiment of the invention, as illustrated in FIGS. 8 and 11, a pixel PX may include a unit pixel electrode UPXE disposed in each of a plurality of unit pixel regions UPX. The unit pixel electrodes UPXE may be separated or spaced apart from each other by a predetermined distance with an in-between area IB including a first in-between area IB-1 and a second in-between area IB-2, and a connecting electrode LE which connects the unit pixel electrodes UPXE may be disposed in a region in which the first in-between area IB-1 and the second in-between area IB-2 intersect each other. In such an embodiment, a protrusion BA may be disposed on the connecting electrode LE.

In Comparative Example 1 illustrated in FIGS. 9 and 12, a pixel PX may include a unit pixel electrode UPXE disposed in each of a plurality of unit pixel regions UPX. The unit pixel electrodes UPXE may be separated from each other by a predetermined distance by an in-between area IB including a first in-between area IB-1 and a second in-between area IB-2, and each of the first in-between area IB-1 and the second in-between area IB-2 may include a plurality of connecting bridges LE-C which connect the unit pixel electrodes UPXE. In Comparative Example 1, each of the connecting bridges LE-C may be disposed adjacent to ends of horizontal stem electrodes 192*a* or vertical stem electrodes 192*b* of neighboring stem electrodes 192.

In Comparative Example 2 illustrated in FIGS. 10 and 13, each stem electrode 192 or an in-between area IB may slope or have a non-uniform widths.

In Comparative Examples 1 and 2, a connecting bridge LE-C is disposed between adjacent horizontal stem electrodes 192*a* or adjacent vertical stem electrodes 192*b* to connect ends of the horizontal stem electrodes 192*a* or ends of the vertical stem electrodes 192*b*.

In Comparative Examples 1 and 2, the connecting bridge LE-C may be disposed between a first unit pixel electrode UPXE1 and a second unit pixel electrode UPXE2, and the connecting bridge LE-C may be disposed between the horizontal stem electrodes 192*a*.

In Comparative Examples 1 and 2, the connecting bridge LE-C may be disposed between the second unit pixel electrode UPXE2 and a third unit pixel electrode UPXE3, and the connecting bridge LE-C may be disposed between the vertical stem electrodes 192*b*.

In Comparative Examples 1 and 2, the connecting bridge LE-C may be disposed between the third unit pixel electrode UPXE3 and a fourth unit pixel electrode UPXE4 and between the fourth unit pixel electrode UPXE4 and the first unit pixel electrode UPXE1.

The movements of liquid crystals on the connecting bridge LE-C disposed between the first unit pixel electrode UPXE1 and the second unit pixel electrode UPXE2 will now be described in detail.

As described above, fringe fields are generated by the pixel electrode PXE and the common electrode 270, and the liquid crystal molecules 302 tilt in directions perpendicular to the fringe fields, and the liquid crystal molecules 302 are arranged in the direction of an average liquid crystal azimuthal angle in each domain.

However, liquid crystal molecules 302 located in certain regions, for example, in regions, in which the connecting bridge LE-C, sides of the unit pixel electrode UPXE, and the stem electrode 192 are disposed, may not tilt in the direction of the average liquid crystal azimuthal angle, for example, in a predetermined direction such as about 45 degrees or about 135 degrees.

The above-mentioned regions may contribute less to luminance due to lower light transmittance than a region in which the liquid crystal molecules 302 tilt in a predetermined direction. Such regions are collectively referred to as a non-transmitting region.

The non-transmitting region will now be described with reference to FIGS. 12 and 13. Referring to FIGS. 12 and 13, an electric field that controls the liquid crystal molecules 302 and an electric field opposite thereto are similar in a region in which the connecting bridge LE-C is disposed. Therefore, the liquid crystal molecules 302 may not be moved in the region of the connecting bridge LE-C.

For convenience of description, a stem electrode region of a unit pixel electrode UPXE is defined as a third region Z, a region in which the connecting bridge LE-C is disposed is defined as a second region Y, and a region in which the protrusion BA is disposed on the connecting electrode LE according to an embodiment of invention is defined as a first region X.

In the third region Z, i.e., in the stem electrode region of the unit pixel electrode UPXE in Comparative Example 1, texture may be generated as illustrated in FIGS. 9 and 12. In Comparative Example 1, the first in-between area IB-1 and the second in-between area IB-2 of the in-between area IB may have uniform widths, and the horizontal stem electrode 192a and the vertical stem electrode 192b of the stem electrode 192 may have uniform widths.

Since the first in-between area IB-1 and the second in-between area IB-2 have uniform widths, horizontal electric fields having different intensities may collide with each other in the stem electrode region of the unit pixel electrode UPXE, thereby generating texture.

In Comparative Example 1, the central electrode 192c, the horizontal stem electrode 192a, and the vertical stem electrode 192b have widths substantially the same as each other. Accordingly, distances from the central electrode 192c to the first through fourth branch electrodes 193a through 193d may be different. Therefore, horizontal electric field components may have different intensities in the stem electrode region of the unit pixel electrodes UPXE.

In Comparative Example 1, a distance between each region, in which a chamfered pattern 194 is disposed, and the second region Y, in which the connecting bridge LE-C is disposed, may be different, thus creating different horizontal electric field components. The horizontal electric field components having different intensities may collide with each other to generate texture.

Referring to FIGS. 10 and 13, in Comparative Example 2, the generation of texture in the third region Z, i.e., the stem electrode region of the unit pixel electrode UPXE may be minimized by adjusting the widths of the horizontal stem electrode 192a and the vertical stem electrode 192b of the unit pixel electrode UPXE to be non-uniform, and the generation of texture may be minimized by adjusting the widths of the first in-between area IB-1 and the second in-between area IB-2 to be non-uniform.

As shown in FIGS. 10 and 13, the width of the stem electrode 192 may be reduced from the central electrode 192c of the stem electrode 192 toward each side region of the unit pixel electrode UPXE. The horizontal stem electrode 192a or the vertical stem electrode 192b adjacent to the central electrode 192c may have a width of b2, and the horizontal stem electrode 192a or the vertical stem electrode 192b adjacent to each side region of the unit pixel electrode UPXE may have a width of b1. Here, b2 may be greater than b1.

In addition, the width of the first in-between area IB-1 or the second in-between area IB-2 may be reduced from the chamfered pattern 194 toward the connecting bridge LE-C. As shown in FIGS. 10 and 13, the first in-between area IB-1 or the second in-between area IB-2 disposed adjacent to the chamfered pattern 194 may have a width of a2, and the first in-between area IB-1 or the second in-between area IB-2 disposed adjacent to the connecting electrode LE-C may have a width of a1. Here, a2 may be greater than a1.

By adjusting the widths of the horizontal stem electrode 192a and the vertical stem electrode 192b and the width of the first in-between area IB-1 or the second in-between area IB-2 to be non-uniform as described above, the distances from the central electrode 192c to the first through fourth branch electrodes 193a through 193d may be minimized, thus allowing similar horizontal electric field components to be generated. Accordingly, the generation texture in the third region Z, i.e., in the stem electrode region of the unit pixel electrode UPXE, is substantially minimized.

In the second region Y in which the connecting bridge LE-C is disposed, the first horizontal electric field F1 and the third horizontal electric field F3 generated in side regions of adjacent unit pixel electrodes UPXE may have similar intensities. In the second region Y, since the first horizontal electric field F1 and the third horizontal electric field F3 having similar intensities act in opposite directions, thereby offsetting each other. Here, the second horizontal electric field F2 and the fourth horizontal electric field F4 may also act to control the liquid crystal molecules 302 disposed in the second region Y to be arranged in a direction parallel to the lengthwise direction of the horizontal stem electrode 192a. Alternatively, the forces by the above electric fields may act the other way around.

Therefore, the first directors 301a moved by the first horizontal electric field F1 or the third directors 301c moved by the third horizontal electric field F3 may exist in the second region Y. Alternatively, horizontal electric fields applied to the connecting bridge LE-C may offset each other, thus leaving the liquid crystal molecules 302 perpendicular to the surface.

As described above, the liquid crystal molecules 302 having the first directors 301a or the third directors 301c may exist in the second region Y, and the first directors 301a or the third directors 301c may reduce luminance by failing to transmit light in a direction parallel to the polarization axes of the first and second polarizing plates 140 and 240.

Since only the intensity of the component of the first horizontal electric field F1 or the third horizontal electric field F3 exists in the second region Y, the first directors 301a or the third directors 301c may be arranged in the second region Y. Here, vectors that may rearrange the first directors 301a or the third directors 301c, that is, the second horizontal electric field F2 and the fourth horizontal electric field F4 have similar intensities. Therefore, the intensities of the second horizontal electric field F2 and the fourth horizontal electric field F4 may offset each other. As a result, the vectors that may rearrange the first directors 301a or the third directors 301c may be insignificant. Accordingly, the liquid crystal molecules 302 may be arranged in a direction parallel to the lengthwise direction of the horizontal stem electrode 192a or the vertical stem electrode 192b.

Therefore, of the liquid crystal molecules 302 moved by the fringe fields (F1-F4), some liquid crystal molecules 302 disposed in the second region Y may have the first directors 301a in a direction substantially parallel to the polarization axes of the first and second polarizing plates 140 and 240. In addition, since an electric field cannot reach the second region Y, unrestored liquid crystal molecules 302 may exist in the second region Y, thereby generating texture. The generated texture may cause a reduction in transmittance. The LCD 1 may have maximum transmittance when the arrangement direction of the liquid crystal molecules 302 is at about 45 degrees to the polarization axes of the first and second polarizing plates 140 and 240 in response to the application of voltages to the first and second substrates 100 and 200.

However, as described above, the liquid crystal molecules 302 disposed in the second region Y and the third region Z may be in a direction similar to the polarization axes of the first and second polarizing plates 140 and 240. Accordingly, the transmittance of the LCD 1 may be reduced in the second region Y of the pixel PX due to the liquid crystal molecules 302 in the direction similar to the polarization axes of the first and second polarizing plates 140 and 240. That is, in the second region Y or the third region Z, an angle formed by the liquid crystal molecules 310 and the polarization axes of the first and second polarizing plates 140 and 240 is substantially different from about 45 degrees, thereby reducing light transmittance.

In an embodiment of the invention, referring to FIGS. 8 and 11, a pixel PX may include a unit pixel electrode UPXE disposed in each of a plurality of unit pixel regions UPX. The unit pixel electrodes UPXE may be separated from each other by a predetermined distance by an in-between area IB including a first in-between area IB-1 and a second in-between area IB-2.

In such an embodiment, a connecting electrode LE which connects the unit pixel electrodes UPXE may be disposed in a region, in which corners of two or more unit pixel electrodes UPXE face each other with the first in-between area IB-1 or the second in-between area IB-2 interposed therebetween. Further, a protrusion BA may be disposed on the connecting electrode LE.

In such an embodiment, where the connecting electrode LE is disposed as shown in FIG. 8, the in-between area IB and stem electrodes 192 may slope in the first region X, thus allowing electric fields to reach the region in which the connecting electrode LE is disposed. Accordingly, the liquid crystal molecules 302 may be arranged in directions similar to the directions a, b, c and d of the average liquid crystal azimuthal angles.

In such an embodiment, where the connecting electrode LE and the protrusion BA are disposed as shown in FIG. 8, the liquid crystal molecules 302 arranged by horizontal electric fields and vectors that may rearrange the liquid crystal molecules 302 by causing the liquid crystal molecules 302 to collide with each other may exist in the first region X. Here, the vectors are formed by the protrusion BA.

Therefore, in the first region X in which the protrusion BA is disposed, the liquid crystal molecules 302 arranged by fringe fields may collide with each other to be rearranged in the directions similar to the directions a, b, c and d of the average liquid crystal azimuthal angles.

In such an embodiment, referring to FIG. 8, in regions of the first through fourth unit pixel electrodes UPXE1 through UPXE4 which are adjacent to the first region X in which the protrusion BA is disposed, horizontal components other than first through fourth horizontal components may be formed by the protrusion BA. The protrusion BA may control liquid crystals therearound, thereby moving the liquid crystal molecules 302.

In an embodiment, the protrusion BA may be a quadrilateral protrusion BA as shown in FIG. 8. However, the same horizontal electric field components may also be generated by a circular protrusion. The quadrilateral protrusion BA will hereinafter be described by defining a right surface of the quadrilateral protrusion BA as a first surface, an upper surface as a second surface, a left surface as a third surface, and a lower surface as a fourth surface.

In one embodiment, for example, the first surface of the protrusion BA may provide a first component f1 of the control over liquid crystals in a right direction. In such an embodiment, the second through fourth surfaces of the protrusion BA may provide second through fourth components f2 through f4 of the control over liquid crystals, respectively.

In such an embodiment, the first surface of the protrusion BA may include a domain of any one of the first unit pixel electrode UPXE1 and the fourth unit pixel electrode UPXE4. The move of the liquid crystal molecules 302 in the first unit pixel electrode UPXE1 in such an embodiment will now be described in detail.

The first surface of the protrusion BA may partially overlap the third domain Dc of the first unit pixel electrode UPXE1 to provide the first component f1 to the third domain Dc. Here, the first component f1 may collide with the fourth horizontal electric field F4 in the first unit pixel electrode UPXE1, thereby rearranging the liquid crystal molecules 302. That is, the protrusion BA may form vectors that may rearrange the liquid crystal molecules 302 located around the connecting electrode LE. Accordingly, the liquid crystal molecules 302 may collide with each other to be arranged at azimuthal angles similar to the average azimuthal liquid crystal angles (a, b, c and d).

In this regard, the liquid crystal molecules 302 disposed in the third domain Dc of the first unit pixel electrode UPXE1 may be arranged in the direction c of the average liquid crystal azimuthal angle.

In Comparative Examples 1 and 2, the liquid crystal molecules 302 are arranged in a direction horizontal to the polarization axes in the region in which the connecting bridge LE-C is disposed, thereby reducing transmittance. In an embodiment of the invention, where the unit pixel electrode UPXE includes the connecting electrode LE which connects the unit pixel electrodes UPXE and the protrusion BA which is disposed on the connecting electrode LE, and the connecting electrode LE is disposed in the region in which the corners of two or more unit pixel electrodes UPXE face each other with the first in-between area IB-1 or the second in-between area IB-2 interposed therebetween, such that the connecting electrode LE and the protrusion BA may minimize the liquid crystal molecules 302 arranged irregularly around the connecting electrode LE, thereby minimizing a reduction in transmittance.

In an embodiment, as described above, where a pixel PX includes sloping stem electrodes 192, a connecting electrode LE connecting a plurality of unit pixel electrodes UPXEs, and a protrusion BA disposed on the connecting electrode LE, the generation of texture in side regions of each unit pixel electrode UPXE and a region, in which the connecting electrode LE is disposed, may be improved.

Therefore, the connecting electrode LE and the protrusion BA disposed on the connecting electrode LE in the LCD 1 may control the liquid crystal molecules 302 located on the connecting electrode LE to be arranged in the directions a, b, c and d of the average liquid crystal azimuthal angles, thereby improving the transmittance and lateral viewing angle of the LCD 1.

Figure 14:
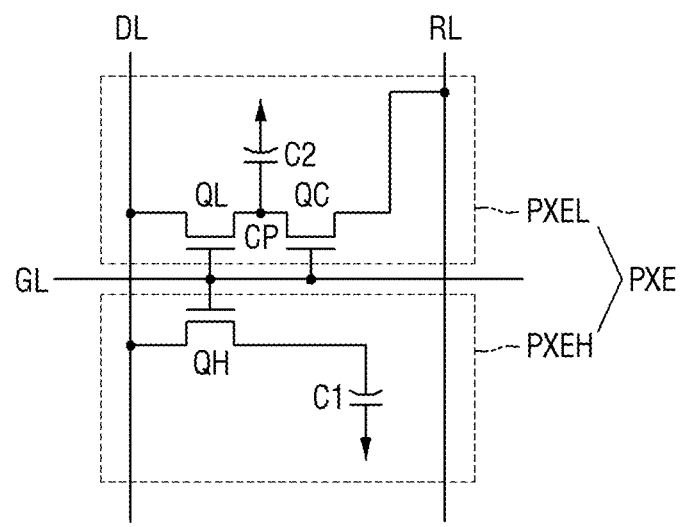
FIG. 14 is an equivalent circuit diagram of a pixel of an LCD according to an embodiment of the invention.
Figure 15:
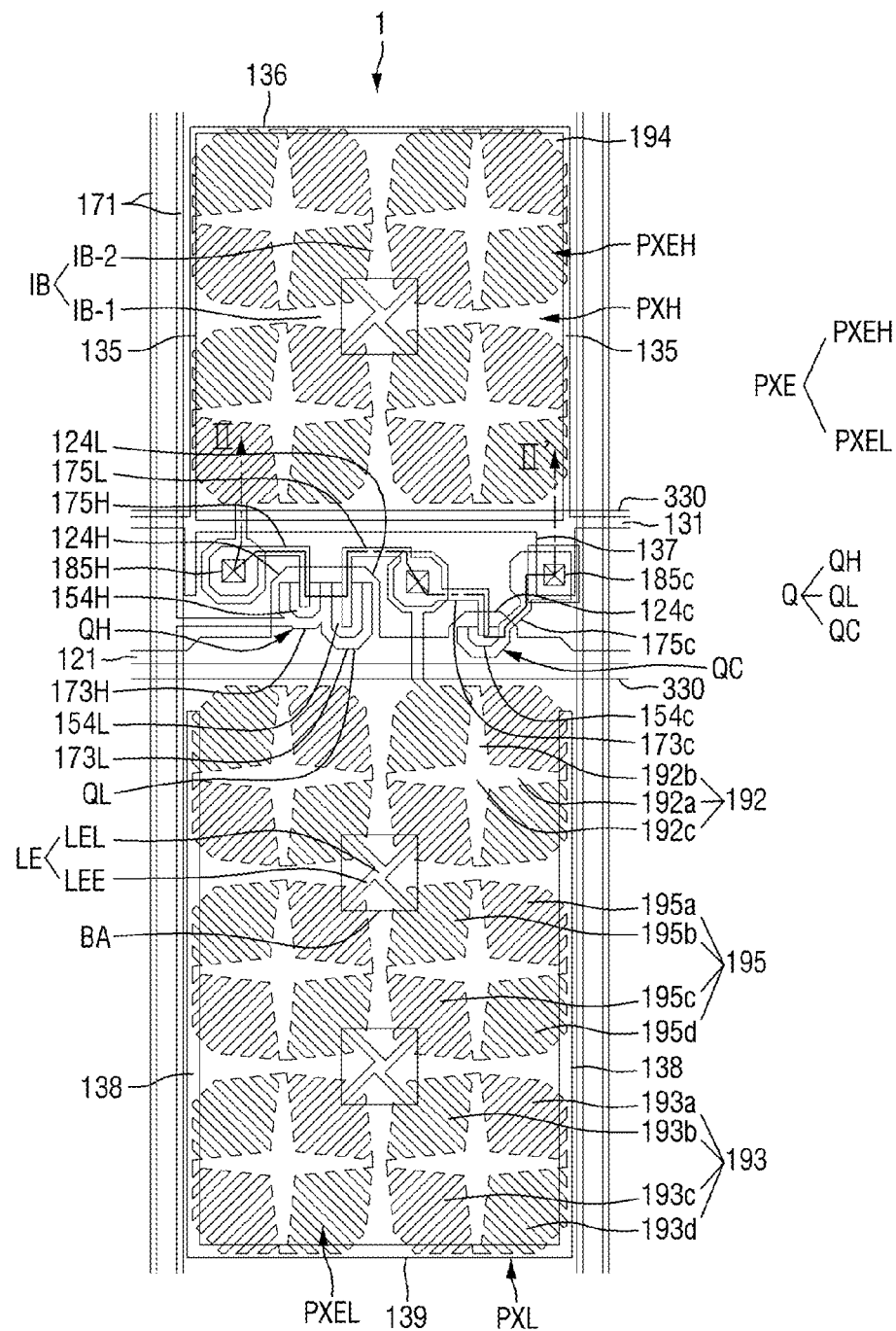
FIG. 15 is a plan view of an LCD according to an embodiment of the invention.
Figure 16:
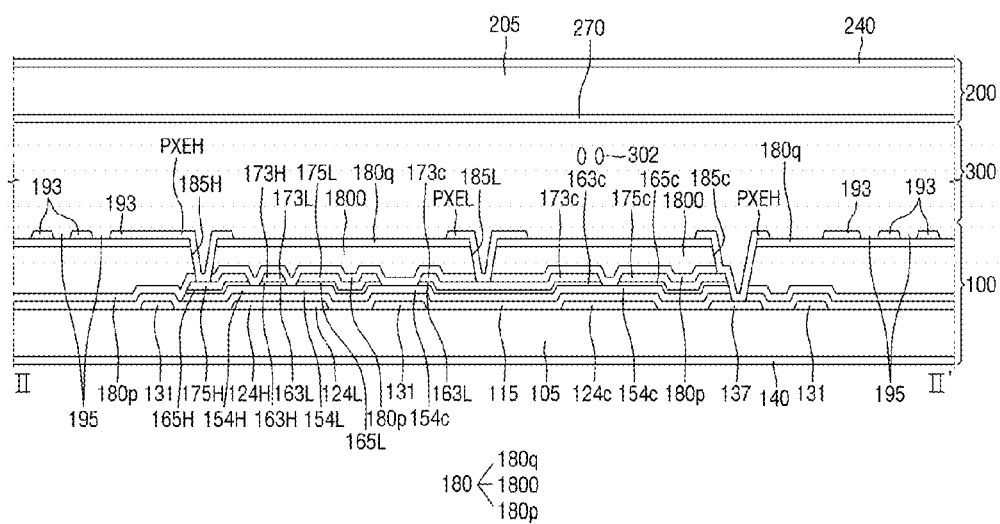
FIG. 16 is a cross-sectional view of the LCD, taken along line II-II' of FIG. 15.

FIG. 14 is an equivalent circuit diagram of a pixel of an LCD according to an embodiment of the invention. FIG. 15 is a plan view of an LCD 1 according to an embodiment of the invention. FIG. 16 is a cross-sectional view of the LCD 1, taken along line II-IF of FIG. 15.

In FIGS. 14 through 16, a pixel PX and a gate line GL, a data line DL, a voltage dividing reference line RL corresponding to the pixel PX are illustrated for ease of description. However, in such an embodiment, a plurality of pixels PX may be arranged in a matrix of rows and columns, and the pixels PX may be disposed near intersections of a plurality of gate lines 121 extending along a row direction and a plurality of data lines 171 extending along a column direction.

In an embodiment of the LCD 1 according to the invention, a voltage is applied to between a pixel electrode PXE and a common electrode 270. The applied voltage changes the behavior of liquid crystal molecules 302, thereby changing a refractive index of liquid crystals to display a desired gray level.

In such an embodiment, the LCD 1 has a high contrast ratio due to superior dark characteristics. In such an embodiment, since the LCD 1 uses negative liquid crystals, transmittance of the liquid crystals according to the behavior of the liquid crystal molecules 302 may vary based on a direction in which the LCD 1 is viewed. That is, since the transmittance of the LCD 1 varies according to the direction in which the LCD 1 is viewed, the viewing angle thereof may be limited.

In such an embodiment, to improve the viewing angle of the LCD 1, a plurality of domains in which the liquid crystal molecules 302 are arranged in different directions may be formed by forming an electrode pattern on each of a first substrate 100 and a second substrate 200. In such an embodiment, the electrode pattern may be, for example, the pixel electrode PXE or the common electrode 270.

The formation of the domains, e.g., first through fourth domains Da through Dd, may minimize a difference in refractive index of liquid crystals according to the direction of the viewing angle, thereby improving visibility. However, while the first through fourth domains Da through Dd may minimize the difference in refractive index of the liquid crystals according to the direction of the viewing angle, distortion of a gray curve on the sides of the pixel PX may occur because the first through fourth domains Da through Dd reduce light efficiency on the sides of the pixel PX due to a disclination line. The disclination line is created because some liquid crystal molecules 302 are arranged in a direction matching polarization axes of first and second polarizing plates 140 and 240 when a bright state and a dark state are implemented.

In an embodiment, to improve light efficiency on the sides of the pixel PX, the distortion of the gray curve in a low gray level range (dark state) and a high gray level range (bright state) may be reduced by changing the electrode pattern (PXE, 270). In such an embodiment, the distortion of the gamma curve may be minimized by reducing the difference in transmittance between high gray levels and low gray levels, thereby improving visibility.

Hereinafter, an embodiment of the LCD 1 having improved visibility will be described in detail.

Referring to FIGS. 14 through 16, an embodiment of the LCD 1 may include the first substrate 100 and the second substrate 200, which face each other, and a liquid crystal layer 300 which is disposed between the second substrate 200 and the first substrate 100.

The first substrate 100 or the second substrate 200 may further include switching devices (QH, QL, QC), a color filter 1800, and a light-blocking member 330. One of the first polarizing plate 140 and the second polarizing plate 240 may be omitted.

Each of the first substrate 100 and the second substrate 200 will hereinafter be described in detail.

In such an embodiment, the first substrate 100 may include a first insulating substrate 105, a first switching device QH, a second switching device QL, and a third switching device QC. In such an embodiment, the first substrate 100 may include a gate line 121, a voltage dividing reference line 131, a data line 171, and a pixel electrode PXE which are electrically connected to the first, second and third switching devices QH, QL and QC. The pixel electrode PXE includes a first subpixel electrode PXEH and a second subpixel electrode PXEL.

The first substrate 100 includes a plurality of gate conductors, and the gate conductors include the gate line 121, the voltage dividing reference line 131, and first and second storage electrodes 135, 136, 138 and 139 disposed on the first insulating substrate 105. The first insulating substrate 105 may include or be made of glass, such as soda lime glass or borosilicate glass, or plastic, for example.

The gate line 121 and the voltage dividing reference line 131 may extend along a direction, e.g., a horizontal direction, and transmit a gate signal. The gate line 121 may include a first gate electrode 124H and a second gate electrode 124L which is defined by a protruded portion thereof and located between the first subpixel electrode PXEH and the second subpixel electrode PXEL. The gate line 121 may further include a third gate electrode 124c which protrudes upward. Here, the first gate electrode 124H and the second gate electrode 124L may be connected to each other, thereby defining one protrusion formed as a single unitary unit.

In such an embodiment, a step-down gate line different from the gate line 121 may also be provided.

The voltage dividing reference line 131 may extend along the horizontal direction and deliver a predetermined voltage such as a common voltage. The voltage dividing reference line 131 may include the first storage electrodes 135 and 136 and may further include the second storage electrodes 138 and 139 extending downward.

In an embodiment, the first vertical storage electrode 135 may be formed along vertical edges of the first subpixel electrode PXEH disposed in an upper part of a pixel PX. In such an embodiment, the second vertical storage electrode 138 may be formed along vertical edges of the second pixel electrode PXEL disposed in a lower part of the pixel PX. The second horizontal storage electrode 139 may be located between a horizontal edge of the second pixel electrode PXEL and a horizontal edge of the first pixel electrode PXEH, and the first and second horizontal storage electrodes 136 and 139 may be disposed along the two horizontal edges.

In such an embodiment, the first vertical storage electrode 135 and the first horizontal storage electrode 136 may be disposed along the edges of the first pixel electrode PXEH to overlap at least part of the first pixel electrode PXEH, and the second vertical storage electrode 138 and the second horizontal storage electrode 139 may be disposed along the edges of the second pixel electrode PXEL to overlap at least part of the second pixel electrode PXEL.

In an embodiment, as shown in FIG. 15, the first horizontal storage electrode 136 located in the upper part of the pixel PX and the second horizontal storage electrode 139 located in the lower part of the pixel PX are separated from each other. In such an embodiment, the two horizontal storage electrodes 136 and 139 may be electrically connected to their counterparts in vertically adjacent pixels PX, thereby surrounding the first and second subpixel electrodes PXEH and PXEL in one pixel PX in a ring shape.

The gate line 121, the voltage dividing reference line 131 and the first and second storage electrodes 135, 136, 138 and 139 may include or be formed of a same material and disposed in a same layer. The gate line 121, the voltage diving reference line 131 and the first and second storage electrodes 135, 136, 138 and 139 may include or be made of aluminum (A1)-based metal such as aluminum and an aluminum alloy, silver (Ag)-based metal such as silver and a silver alloy, copper (Cu)-based metal such as copper and a copper alloy, molybdenum (Mo)-based metal such as molybdenum and a molybdenum alloy, chrome (Cr), titanium (Ti), or tantalum (Ta).

In such an embodiment, the gate line 121, the voltage dividing reference line 131 and the first and second storage electrodes 135, 136, 138 and 139 may have a multilayer structure including two conductive layers (not illustrated) having different physical characteristics from each other. In one embodiment, for example, one of the two conductive layers may include or be made of a metal with low resistivity, such as aluminum-based metal, silver-based metal or copper-based metal, to reduce a signal delay or a voltage drop of the gate line 121.

A gate insulating layer 115 may be disposed on the whole surface of the first insulating substrate 105 to cover the gate line 121, the voltage dividing reference line 131 and the first and second storage electrodes 135, 136, 138 and 139 disposed thereon. The gate insulating layer 115 may include or be made of, e.g., silicon oxide (SiOx) or silicon nitride (SiNx).

First, second and third semiconductor layers 154H, 154L and 154c may be disposed on the gate insulating layer 115. At least part of the first, second and third semiconductor layers 154H, 154L and 154c may overlap the first, second and third gate electrodes 154H, 154L and 154c, respectively. In an embodiment, the first, second and third semiconductor layers 154H, 154L and 154c may include or be made of an oxide semiconductor such as amorphous silicon, polycrystallinen silicon, or zinc oxide (ZnO).

A plurality of ohmic contact members 163H, 165H, 163L, 165L, 163c and 165c may be disposed on the first, second and third semiconductor layers 154H, 154L and 154c. In such an embodiment, the ohmic contact members 163H, 165H, 163L, 165L, 163c and 165c may be disposed on the corresponding first, second and third semiconductor layers 154H, 154L and 154c.

A plurality of data conductors are disposed on the ohmic contact members 163H, 165H, 163L, 165L, 163c and 165c and the gate insulating layer 115. In an embodiment, the data conductors includes the data line 171 including a first source electrode 173H and a second source electrode 173L, a first drain electrode 175H, a second drain electrode 175L, a third source electrode 173c and a third drain electrode 175c. The data conductors and the first, second and third semiconductor layers 154H, 154L and 154c and the ohmic contact members 163H, 165H, 163L, 165L, 163c and 165c located under the data conductors may be formed simultaneously using a same mask. In an embodiment, the data line 171 includes a wide end (not illustrated) for connection to another layer or an external driver circuit.

A data conductive layer is disposed on the first, second and third semiconductor layers 154H, 154L and 154c. The data conductive layer may include the data line 171 extending in a vertical direction to intersect the gate line 121.

The data line 171 may transmit a data signal and extend along the vertical direction to intersect the gate line 121 and the voltage dividing reference line 131. The data line 171 may include the first source electrode 173H and the second source electrode 173L which extend toward the first gate electrode 124H and the second gate electrode 124L and are connected to each other.

The data conductive layer may include the first source electrode 173H and the second source electrode 173L which are connected to the data line 171, the first drain electrode 175H which faces the first source electrode 173H and is separated from the first source electrode 173H, the second drain electrode 175L which faces the second source electrode 173L and is spaced apart from the second source electrode 173L, the third source electrode 173c which is electrically connected to the second drain electrode 175L, and the third drain electrode 175c which faces the third source electrode 173c and is spaced apart from the third source electrode 173c.

An end of the first drain electrode 175H and an end of the second drain electrode 175L may be partially surrounded by the first source electrode 173H and the second source electrode 173L. A wide end of the second drain electrode 175L may further extend to form the third source electrode 173c that is bent in a U-like shape. A wide end of the third drain electrode 175c may overlap a reference electrode 137 to be connected to a third contact hole 185c, and the other end of the third drain electrode 175c may be partially surrounded by the third source electrode 173c.

In an embodiment, the first, second and third semiconductor layers 154H, 154L and 154c may have substantially a same planar shape as the data conductors (171, 175H, 175L, 175c) and the ohmic contact members 163H, 165H, 163L, 165L, 163c and 165c under the data conductors, except for channel regions between the first, second and third source electrodes 173H, 173L and 173c and the first, second and third drain electrodes 175H, 175L and 175c. In such an embodiment, the first, second and third semiconductor layers 154H, 154L and 154c may include exposed portions not covered by the data conductors (171, 175H, 175L, 175c), such as portions between the first, second and third source electrodes 173H, 173L and 173c and the first, second and third drain electrodes 175H, 175L and 175c.

The data line 171 may directly contact the first, second and third semiconductor layers 154H, 154L and 154c, thereby forming an ohmic contact. The data line 171 may be a single layer including or made of a material with low resistivity to serve as an ohmic contact together with the first, second and third semiconductor layers 154H, 154L and 154c. For example, the data line 171 may be made of Cu, Al, or Ag.

To improve ohmic contact characteristics together with the first, second and third semiconductor layers 154H, 154L and 154c, the data line 171 may have a single layer structure or a multilayer structure including or made of Ni, Co, Ti, Ag, Cu, Mo, Al, Be, Nb, Au, Fe, Se or Ta. In one embodiment, for example, the multilayer may include a double layer such as Ta/Al, Ta/Al, Ni/Al, Co/Al, Mo(Mo alloy)/Cu, Mo(Mo alloy)/Cu, Ti(Ti alloy)/Cu, TiN(TiN alloy)/Cu, Ta(Ta alloy)/Cu or TiOx/Cu and a triple layer such as Ti/Al/Ti, Ta/Al/Ta, Ti/Al/TiN, Ta/Al/TaN, Ni/Al/Ni or Co/Al/Co.

The first, second and third gate electrodes 124H, 124L and 124c, the first, second and third source electrodes 173H, 173L and 173c, and the first, second and third drain electrodes 175H, 175L and 175c may collectively define first, second and third thin film transistors ("TFT"s) QH, QL and QC together with the first, second and third semiconductor layers 154H, 154L and 154c, respectively. Channels of the TFTs may be formed in the first, second and third semiconductor layers 154H, 154L and 154c between the first, second and third source electrodes 173H, 173L and 173c and the first, second and third drain electrodes 175H, 175L and 175c, respectively.

A passivation layer 180 may be disposed on the data conductors (171, 175H, 175L, 175c) and the exposed portions of the first, second and third semiconductor layers 154H, 154L and 154c. The passivation layer 180 may include be made of an inorganic layer or an organic layer. Alternatively, the passivation layer 180 may have a double-layer structure including a lower inorganic layer and an upper organic layer in order to protect the first, second and third semiconductor layers 154H, 154L and 154c. Alternatively, the passivation layer 180 may have a triple-layer structure including an inorganic layer, an organic layer disposed on the inorganic layer, and another inorganic layer disposed on the organic layer. In an embodiment, the organic layer used in the passivation layer 180 may be the color filter 1800.

In an embodiment, as shown in FIG. 16, a lower passivation layer 180p of the passivation layer 180 may be disposed on the data conductors (171, 175H, 175L, 175c) and the exposed portions of the first, second and third semiconductor layers 154H, 154L and 154c. The lower passivation layer 180p may include or be made of an inorganic insulating material such as silicon nitride or silicon oxide.

An organic layer of the passivation layer 180 may be formed on the lower passivation layer 180p. Here, the organic layer may be the color filter 1800. The color filter 1800 may extend along the vertical direction between neighboring data lines 171. Each color filter 1800 may display one of three primary colors of red, green and blue. Each color filter 1800 may be disposed on the data line 171 to overlap the data line 171.

An upper passivation layer 180q of the passivation layer 180 may be disposed on portions of the lower passivation layer 180p exposed by the color filter 1800 and openings. The upper passivation layer 180q may prevent the lifting of the color filter 1800 and suppress the contamination of the liquid crystal layer 300 by organic matter such as a solvent introduced from the color filter 1800, thereby effectively preventing a defect such as an afterimage created during screen driving. The upper passivation layer 180q may include or be made of an inorganic insulating material or an organic material such as silicon nitride or silicon oxide.

A first contact hole 185H and a second contact hole 185L, which respectively expose an end of the first drain electrode 175H and an end of the second drain electrode 175L, may be defined in the lower passivation layer 180p, the color filter 1800 and the upper passivation layer 180q.

The pixel electrode PXE is disposed on the upper passivation layer 180q. The pixel electrode PXE may be connected to the first drain electrode 175H and the second drain electrode 175L by the first contact hole 185H and the second contact hole 185L. The pixel electrode PXE may include or be made of a transparent conductor such as indium tin oxide ("ITO") or indium zinc oxide ("IZO"). In response to a voltage received through the first drain electrode 175H and the second drain electrode 175L to which a data voltage has been applied, the pixel electrode PXE generates an electric field together with the common electrode 270 disposed on the second substrate 200, thereby moving or rotating the liquid crystal molecules 302 of the liquid crystal layer 300 disposed between the first substrate 100 and the second substrate 200.

The pixel electrode PXE may receive a data voltage through TFTs controlled by a gate signal. In other words, the first subpixel electrode PXEH and the second subpixel electrode PXEL disposed as in FIG. 15 may be connected to the first drain electrode 175H and the second drain electrode 175L by the first contact hole 185H and the second contact hole 185L and receive data voltages from the first drain electrode 175H and the second drain electrode 175L, respectively.

The pixel electrode PXE may be disposed in each pixel PX defined by the gate line 121 and the data line 171.

The pixel electrode PXE may include the first subpixel electrode PXEH and the second subpixel electrode PXEL which are separated by the gate line 121 and located in upper and lower parts of a pixel region to neighbor each other in the column direction.

The first subpixel electrode PXEH and the second subpixel electrode PXEL disposed in one pixel PX may improve the viewing angle. The pixel electrode PXE is substantially the same as that described above.

The second substrate 200 includes a second insulating substrate 205 which faces the first substrate 100 and the common electrode 270. The common electrode 270 may be disposed on the second substrate 210 including or made of transparent glass or plastic.

In an embodiment, the light-blocking member 330 and the color filter 1800 are disposed in the first substrate 100, as shown in FIG. 16, but not being limited thereto. In an alternative embodiment, the light-blocking member 330 and the color filter 1800 may be optionally disposed in the second substrate 200. In such an embodiment, a light-blocking member, a color filter, an overcoat layer, and a second alignment layer may be disposed in the second substrate 200. Hereinafter, a case where the color filter 1800 and the light-blocking member 330 are disposed on the first panel 100 has been described above.

The color filter 1800 and the light-blocking member 330 disposed in the first substrate 100 may prevent the misalignment of wirings in a curved display device and, when determining an alignment direction together with the second alignment layer, may prevent occurrence of a disclination line that causes the misalignment of liquid crystals.

In an embodiment, where the light-blocking member, the color filter, the overcoat layer and the second alignment layer are disposed on the second substrate 210, a plurality of color filters of multiple colors may be disposed on the second substrate 210, and the light-blocking member may be disposed at a boundary between the color filters. The color filters may filter light of certain wavelengths, and the light-blocking member, which may be referred to as a black matrix, may prevent the leakage of light and color mixing of the color filters.

In an embodiment, the overcoat layer and the second alignment layer may be disposed in the second substrate 200. In such an embodiment, the overcoat layer may be disposed on the whole surface of the second insulating substrate 205 to cover the color filters and the light-blocking member disposed thereon. In such an embodiment, the overcoat layer may include or be made of an insulating material and provide a flat surface. Alternatively, the overcoat layer may be omitted.

The common electrode 270 may be disposed on the overcoat layer. The second alignment layer may be disposed on the common electrode 270 and may be a vertical alignment layer. Alternatively, the second alignment layer may be omitted. The common electrode 270 may be a whole-surface electrode on the second insulating substrate 205.

The operation of an embodiment of the LCD 1 described above will now be described with reference to FIG. 14. Referring to FIG. 14, a pixel PX of an embodiment of the LCD 1 may include the first switching device QH, the second switching device QL and the third switching device QC which may be formed as TFTs and a first liquid crystal capacitor C1 and a second liquid crystal capacitor C2 which may be formed as dielectric substances made of the liquid crystal layer 300.

The first switching device QH and the second switching device QH may have sources (i.e., input terminals) connected to the data line DL and gates (i.e., control terminals) connected to the gate line GL. The third switching device QC may have a gate (i.e., a control terminal) connected to the gate line GL.

A contact point between a drain of the second switching device QL and a source of the third switching device QC may be connected to the second subpixel electrode PXEL of the second liquid crystal capacitor C2, and a drain (i.e., an output terminal) of the first switching device QH may be connected to the first subpixel electrode PXEH of the first liquid crystal capacitor C1. The other terminals of the first and second liquid crystal capacitors C1 and C2 may be connected to the common electrode 270. A drain (i.e., an output terminal) of the third switching device QC may be connected to a storage electrode line. The second subpixel electrode PXEL may be electrically connected to the voltage dividing reference line RL by the third switching device QC.

When a gate-on signal Von is transmitted to the gate line GL, the first, second and third switching devices QH, QL and QC connected to the gate line GL may be turned on. A data voltage applied to the data line DL is delivered to the first subpixel electrode PXEH via the turned-on first switching device QH, and the voltage applied to the second subpixel electrode PXEL may be divided by the third switching device QC connected in series to the second switching device QL. Therefore, the voltage applied to the second subpixel electrode PXEL is smaller than that applied to the first subpixel electrode PXEH.

In such an embodiment, a voltage charged in the first liquid crystal capacitor C1 may be different from a voltage charged in the second liquid crystal capacitor C2. Since the voltage charged in the first liquid crystal capacitor C1 is different from the voltage charged in the second liquid crystal capacitor C2, liquid crystal molecules may tilt at different angles in a first subpixel PXH and a second subpixel PXL. Accordingly, the two subpixels PXH and PXL may have different luminances from each other.

Therefore, by adjusting the voltage charged in the first liquid crystal capacitor C1 and the voltage charged in the second liquid crystal capacitor C2 to be different from each other, an image viewed from the side may be substantially close to an image viewed from the front as possible, thereby improving lateral visibility of the LCD 1.

In an embodiment, as shown in FIG. 14, the third switching device QC connected to the second liquid crystal capacitor C2 and the voltage dividing reference line RL is provided to make the voltage charged in the first liquid crystal capacitor C1 and the voltage charged in the second liquid crystal capacitor C2 different from each other. In an alternative embodiment of an LCD according to the invention, the second liquid crystal capacitor C2 may be connected to a step-down capacitor.

The pixel electrode PXE will now be described in detail with reference back to FIGS. 1 through 8 and 15. Referring to FIGS. 1 through 8 and 15, the pixel PX may be roughly rectangular. The pixel electrode PXE may correspond to and cover the pixel PX, and the common electrode 270 may be disposed as a single piece on the whole of the second substrate 200.

When an electric field is generated in the liquid crystal layer 300 by applying a potential difference between the pixel electrode PXE and the common electrode 270, long axes of the liquid crystal molecules 302 may be arranged perpendicular to the electric field. The degree to which the liquid crystal molecules 302 tilt may determine the degree of change in polarization of light incident upon the liquid crystal layer 300. The change in polarization may be converted into a change in transmittance by the first and second polarizing plates 140 and 240. Accordingly, an image may be displayed on the LCD 1.

In such an embodiment, to improve the viewing angle of the LCD 1 which displays an image, a plurality of domains may be formed by forming patterns in the pixel electrode PXE and the common electrode 270.

When an arrangement direction obtained by taking the average of arrangement directions of the liquid crystal molecules 302 in each of the first through fourth domains Da through Dd is defined as an average azimuthal angle, the average azimuthal angle may be a direction indicated by the sum of a vector created by an electric field in each of the first through fourth domains Da through Dd and a vector created by the collision of liquid crystals.

That is, in each of the first through fourth domains Da through Dd, the liquid crystal molecules 302 may be arranged at an azimuthal angle similar to a direction in which first, second, third or fourth branch electrodes 193a, 193b, 193c or 193d extend. In each of the first through fourth domains Da through Dd, the liquid crystal molecules 302, when viewed from a plan view, may be arranged at the average azimuthal angle corresponding to a direction indicated by an arrow a, b, c or d.

Specifically, the liquid crystal molecules 302 may be arranged in directions substantially parallel to directions from four parts, at which edges of the pixel electrode PXE extending in different directions meet each other toward a central part of each of a horizontal stem electrode 192a and a vertical stem electrode 192b of a stem electrode 192. Therefore, directors of the liquid crystal molecules 302 in each of the first through fourth domains Da through Dd may be arranged by an electric field in a direction similar to the direction in which the first, second, third or fourth branch electrodes 193a, 193b, 193c or 193d extend, and the liquid crystal molecules 302 may tilt in a total of four directions in each region of the field generating electrode.

In an embodiment, as described above, the average azimuthal angle of the liquid crystal molecules 302 may be determined to be the direction similar to the direction in which the first, second, third or fourth branch electrodes 193a, 193b, 193c or 193d extend in each of the first through fourth domains Da through Dd.

Therefore, since the first through fourth branch electrodes 193a through 193d of a pixel PX extend in four directions in such an embodiment, the liquid crystal molecules 310 may also tilt in four directions. In such an embodiment, where the liquid crystal molecules 310 may be tilted in various directions as described above, the standard viewing angle of the LCD 1 may be increased.

To connect unit pixel electrodes UPXE, each having a plurality of domains as described above, a connecting electrode LE is provided. However, a horizontal electric field formed in the connecting electrode LE may cause the liquid crystal molecules 302 located on the connecting electrode LE to be arranged in a direction affected by the first and second polarizing plates 140 and 240, as described above, thereby reducing transmittance.

In an embodiment of the invention, the connecting electrode LE which connects the unit pixel electrodes UPXE is disposed in a region in which corners of two or more unit pixel electrodes UPXE face each other with a first in-between area IB-1 or a second in-between area IB-2 interposed therebetween. In such an embodiment, a protrusion BA is disposed on the connecting electrode LE. Therefore, the connecting electrode LE and the protrusion BA may minimize liquid crystal molecules 302 arranged irregularly around the connecting electrode LE, thereby minimizing a reduction in transmittance.

The connecting electrode LE and the protrusion BA disposed on the connecting electrode LE in the LCD 1 may control the liquid crystal molecules 302 located on the connecting electrode LE to be arranged in the directions a, b, c, and d of the average liquid crystal azimuthal angles, thereby improving the transmittance and lateral viewing angle of the LCD 1.

Figure 17:
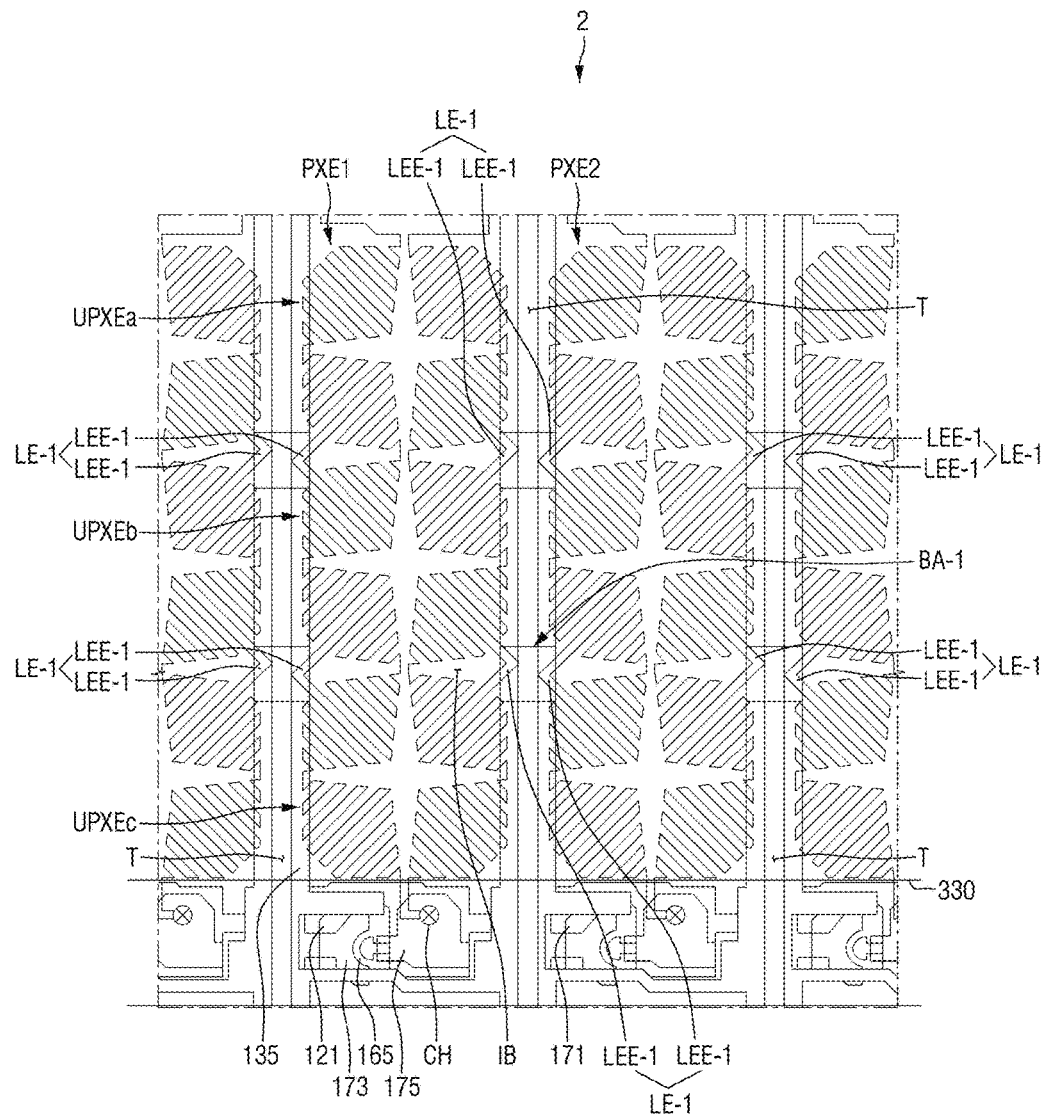
FIG. 17 is a plan view of an LCD according to an alternative embodiment of the invention.

FIG. 17 is a plan view of an LCD 2 according to an alternative embodiment of the invention. The LCD 2 of FIG. 17 is substantially the same as the embodiments of the LCD described above except for the pixel electrode PXE. The same or like elements shown in FIG. 17 have been labeled with the same reference characters as used above to describe the exemplary embodiments of the LCD shown in FIGS. 1 through 8 and 14 through 16, and any repetitive detailed description thereof will hereinafter be omitted or simplified.

Referring to FIG. 17, in an embodiment, a pixel electrode PXE disposed in a pixel PX of the LCD 2 includes a plurality of unit pixel electrodes UPXE.

In the pixel PX, the unit pixel electrodes UPXE are arranged in a vertical direction, and an in-between area IB which horizontally separates the unit pixel electrodes UPXE is defined. The in-between area IB may extend parallel to a horizontal stem electrode 192a and may be the same as the first in-between area IB-1 according to the embodiment described above with reference to FIGS. 1 through 8 and 14 through 16.

Based on a region in which the horizontal stem electrode 192a and a vertical stem electrode 192b intersect each other, the horizontal stem electrode 192a may horizontally separate domains of each unit pixel electrode UPXE, and the vertical stem electrode 192b may vertically separate the domains of each unit pixel electrode UPXE. Here, a central electrode 192c may be disposed in the region in which the horizontal stem electrode 192a and the vertical stem electrode 192b intersect each other. The horizontal stem electrode 192a and the vertical stem electrode 192b may gradually become narrower from the central electrode 192c toward each side region of each unit pixel electrode UPXE.

In such an embodiment, a TFT is connected to each pixel electrode PXE. A pixel electrode PXE connected to a first TFT will be referred to as a first pixel electrode PXE1, and a pixel electrode PXE connected to a second TFT will be referred to as a second pixel electrode PXE2.

The first pixel electrode PXE1 and the second pixel electrode PXE2 are separated from each other by a predetermined gap T to prevent the interference therebetween. The gap T may play a similar role to the second in-between area IB-2 according to the previous embodiment of FIGS. 1 through 8. Here, the second in-between area IB-2 may be a region extending in the vertical direction to vertically separate the first pixel electrode PXE1 and the second pixel electrode PXE2.

The in-between area IB or the gap T may gradually become narrower from a side region of each unit pixel electrode UPXE toward a region adjacent to an end of a stem electrode 192. In FIG. 17, however, the gap T is not tapered for convenience of illustration.

Each of the first pixel electrode PXE1 and the second pixel electrode PXE2 includes a first unit pixel electrode UPXEa, a second unit pixel electrode UPXEb, and a third unit pixel electrode UPXEc. The first unit pixel electrode UPXEa, the second unit pixel electrode UPXEb, and the third unit pixel electrode UPXEc are connected by connecting electrodes LE-1. In an embodiment, as shown in FIG. 17, the vertical stem electrodes 192b of the first unit pixel electrode UPXEa, the second unit pixel electrode UPXEb, and the third unit pixel electrode UPXEc may be connected to each other, but not being limited thereto. In an alternative embodiment, the vertical stem electrodes 192b of the first unit pixel electrode UPXEa, the second unit pixel electrode UPXEb, and the third unit pixel electrode UPXEc may be disconnected or spaced apart from each other In an embodiment, a connecting electrode LE-1 may be disposed in a region in which corners of two or more unit pixel electrodes UPXE face each other with the in-between area B and the gap T interposed therebetween. In such an embodiment, the connecting electrode LE-1 may connect the unit pixel electrodes UPXE to each other.

In such an embodiment, the connecting electrode LE-1 may be disposed on the in-between area IB, but not on the gap T. However, the invention is not limited thereto. Since the first pixel electrode PXE1 and the second pixel electrode PXE2 are connected to different TFTs to receive different signals, they are not connected to each other.

A protrusion BA-1 may be disposed on a region in which the in-between area IB and the gap T intersect each other and in which the connecting electrode LE-1 is disposed.

The protrusion BA-1 disposed on the region in which the in-between area IB and the gap T intersect each other may minimize texture generated around the connecting electrode LE-1.

Therefore, the connecting electrode LE-1 and the protrusion BA-1 disposed on the connecting electrode LE-1 in the LCD 2 may control liquid crystal molecules 302 located on the connecting electrode LE-1 to be arranged in directions a, b, c, and d of average liquid crystal azimuthal angles, thereby improving the transmittance and lateral viewing angle of the LCD 2.

According to embodiments of the invention, visibility and transmittance may be improved by placing a connecting electrode, which connects unit pixel electrodes, in a region in which corners of the unit pixel electrodes face each other and placing a protrusion on the connecting electrode.

However, the effects of the invention are not restricted to the one set forth herein. The above and other effects of the invention will become more apparent to one of daily skill in the art to which the invention pertains by referencing the claims.

The foregoing is illustrative of the invention and is not to be construed as limiting thereof. Although a few embodiments of the invention have been described, those skilled in the art will readily appreciate that many modifications are possible in the embodiments without materially departing from the novel teachings and advantages of the invention. Accordingly, all such modifications are intended to be included within the scope of the invention as defined in the claims. Therefore, it is to be understood that the foregoing is illustrative of the invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. A liquid crystal display comprising:
a substrate on which a pixel region is defined; and
a pixel electrode which is disposed in the pixel region on the substrate,
wherein the pixel electrode comprises:
a plurality of unit pixel electrodes which are arranged substantially in a matrix form; and
a connecting electrode which connects the unit pixel electrodes to each other,
wherein
neighboring unit pixel electrodes adjacent to each other in a column direction are separated from each other by a first in-between area extending along a row direction,
neighboring unit pixel electrodes adjacent to each other in the row direction are separated from each other by a second in-between area extending along the column direction, and
the connecting electrode is disposed in a region in which corners of the unit pixel electrodes face each other.

2. The liquid crystal display of claim 1, wherein each of the unit pixel electrodes comprises:
a stem electrode including a horizontal stem electrode and a vertical stem electrode, which divide each of the unit pixel electrodes into a plurality of domains; and
a micro-branch part including a plurality of branch electrodes which extend in a direction from a side of the stem electrode,
wherein at least one of the branch electrodes disposed close to the region, in which the corners of the unit pixel electrodes face each other, is connected to the connecting electrode.

3. The liquid crystal display of claim 2, wherein
the micro-branch part of a unit pixel electrode is disposed in each of the domains of the unit pixel electrode,
the branch electrodes are disposed in the micro-branch part, and
a plurality of slit patterns is defined between the branch electrodes.

4. The liquid crystal display of claim 3, wherein the branch electrodes or the slit patterns disposed in a domain are arranged alternately with the branch electrodes or the slit patterns disposed in a neighboring domain adjacent to the domain.

5. The liquid crystal display of claim 3, wherein the branch electrodes and the slit patterns are arranged at a pitch in a range of about 4 micrometers to about 8 micrometers.

6. The liquid crystal display of claim 2, wherein the connecting electrode comprises:
extension electrodes which extend from the at least one of the branch electrodes; and
a land part disposed in a region on which the extension electrodes converge.

7. The liquid crystal display of claim 6, wherein each of the extension electrodes and the branch electrodes has a width in a range of about 1 micrometer to about 5 micrometers.

8. The liquid crystal display of claim 2, wherein
the horizontal stem electrode of a unit pixel electrode horizontally divides the domains of the unit pixel electrode based on a region in which the horizontal stem electrode and the vertical stem electrode intersect each other,
the vertical stem electrode of the unit pixel electrode vertically divides the domains of the unit pixel electrode based on the region in which the horizontal stem electrode and the vertical stem electrode intersect each other,
the stem electrode of the unit pixel electrode further includes a central electrode disposed in the region in which the horizontal stem electrode and the vertical stem electrode intersect each other, and
the horizontal stem electrode and the vertical stem electrode gradually become narrower from the central electrode toward each side region of the unit pixel electrode.

9. The liquid crystal display of claim 8, wherein a length of the micro-branch part extending from a side of the central electrode to a corner region of the unit pixel electrode is in a range of about 24 micrometers to about 32 micrometers.

10. The liquid crystal display of claim 2, wherein the stem electrode has a width in a range of about 2 micrometers to about 5 micrometers.

11. The liquid crystal display of claim 2, wherein a chamfered pattern formed by partially removing the branch electrodes is defined in a corner region of each of the unit pixel electrodes.

12. The liquid crystal display of claim 2, wherein the first in-between area or the second in-between area gradually becomes narrower from a side region of each of the unit pixel electrode toward a region adjacent to an end of the stem electrode thereof.

13. The liquid crystal display of claim 1, wherein a lengthwise direction of the branch electrodes is the same as a direction of an azimuthal angle of liquid crystal molecules.

14. A liquid crystal display comprising:
a substrate on which a pixel region is defined;
a pixel electrode which is disposed in the pixel region on the substrate; and
a protrusion which is disposed on a connecting electrode,
wherein the pixel electrode comprises:
a plurality of unit pixel electrodes which are arranged substantially in a matrix form; and
the connecting electrode which connects the unit pixel electrodes to each other,
wherein
neighboring unit pixel electrodes adjacent to each other in a column direction are separated from each other by a first in-between area extending along a row direction,
neighboring unit pixel electrodes adjacent to each other in the row direction are separated from each other by a second in-between area extending along the column direction, and
the connecting electrode is disposed in a region in which corners of the unit pixel electrodes face each other.

15. The liquid crystal display of claim 14, wherein the protrusion has a circular shape, a quadrilateral shape, or a combination thereof.

16. The liquid crystal display of claim 14, wherein each of the unit pixel electrodes comprises:
a stem electrode including a horizontal stem electrode and a vertical stem electrode, which divide each of the unit pixel electrodes into a plurality of domains; and a micro-branch part including a plurality of branch electrodes which extend in a direction from a side of the stem electrode, wherein at least one of the branch electrodes disposed close to the region, in which the corners of the unit pixel electrodes face each other, is connected to the connecting electrode.

17. The liquid crystal display of claim 16, wherein the horizontal stem electrode of a unit pixel electrode horizontally separates the domains of the unit pixel electrode based on a region in which the horizontal stem electrode and the vertical stem electrode intersect each other, the vertical stem electrode of the unit pixel electrode vertically separates the domains of the unit pixel electrode based on the region in which the horizontal stem electrode and the vertical stem electrode intersect each other, the stem electrode of the unit pixel electrode further includes a central electrode disposed in the region in which the horizontal stem electrode and the vertical stem electrode intersect each other, and the horizontal stem electrode and the vertical stem electrode gradually become narrower from the central electrode toward each side region of the unit pixel electrode.

18. The liquid crystal display of claim 16, wherein the first in-between area or the second in-between area gradually becomes narrower from a side region of each of the unit pixel electrodes toward a region adjacent to an end of the stem electrode thereof.

19. A liquid crystal display comprising:

a substrate on which a plurality of pixel regions is defined;

a plurality of pixel electrodes disposed in the pixel regions on the substrate; and a protrusion which is disposed on a connecting electrode, wherein the pixel electrodes comprise:

a first pixel electrode which is disposed in a first pixel region and includes a plurality of unit pixel electrodes substantially in a matrix form;

a second pixel electrode which is disposed in a second pixel region and includes a plurality of unit pixel electrodes substantially in a matrix form; and the connecting electrode which connects the unit pixel electrodes of the first pixel electrode or the second pixel electrode to each other, wherein neighboring unit pixel electrodes adjacent to each other in a column direction are separated from each other by an in-between area extending along a row direction, neighboring unit pixel electrodes adjacent to each other in the row direction are separated from each other by a gap extending along the column direction, and the connecting electrode is disposed in a region in which corners of the unit pixel electrodes of a same pixel electrode face each other.

20. The liquid crystal display of claim 19, wherein each of the unit pixel electrodes comprises:

a stem electrode including a horizontal stem electrode and a vertical stem electrode which divide each of the unit pixel electrodes into a plurality of domains; and a micro-branch part including a plurality of branch electrodes which extend in a direction from a side of the stem electrode, wherein at least any one of the branch electrodes disposed adjacent to the connecting electrode is connected to the connecting electrode.

21. The liquid crystal display of claim 20, wherein the connecting electrode comprises extension electrodes which extend from the branch electrodes, wherein the extension electrodes converge on the in-between area.

22. The liquid crystal display of claim 20, wherein the horizontal stem electrode of a unit pixel electrode horizontally separates the domains of the unit pixel electrode based on a region in which the horizontal stem electrode and the vertical stem electrode intersect each other, the vertical stem electrode of the unit pixel electrode vertically separates the domains of the unit pixel electrode based on the region in which the horizontal stem electrode and the vertical stem electrode intersect each other, the stem electrode of the unit pixel electrode further include a central electrode disposed in the region in which the horizontal stem electrode and the vertical stem electrode intersect each other, and the horizontal stem electrode and the vertical stem electrode gradually become narrower from the central electrode toward each side region of the unit pixel electrode.

23. The liquid crystal display of claim 20, wherein the in-between area or the gap gradually becomes narrower from a side region of each of the unit pixel electrodes toward a region adjacent to an end of the stem electrode thereof.

24. The liquid crystal display of claim 19, wherein the protrusion has a circular shape, a quadrilateral shape, or a combination thereof.

* * * * *